(12) United States Patent
Beaufays et al.

(10) Patent No.: US 12,347,419 B2
(45) Date of Patent: *Jul. 1, 2025

(54) UNSUPERVISED FEDERATED LEARNING OF MACHINE LEARNING MODEL LAYERS

(71) Applicant: GOOGLE LLC, Mountain View, CA (US)

(72) Inventors: Françoise Beaufays, Mountain View, CA (US); Khe Chai Sim, Dublin, CA (US); Johan Schalkwyk, Scarsdale, NY (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/659,940

(22) Filed: May 9, 2024

(65) Prior Publication Data
US 2024/0296834 A1 Sep. 5, 2024

Related U.S. Application Data

(63) Continuation of application No. 16/973,605, filed as application No. PCT/US2020/042806 on Jul. 20, 2020, now Pat. No. 12,014,724.

(51) Int. Cl.
G10L 15/06 (2013.01)
G10L 15/187 (2013.01)
(Continued)

(52) U.S. Cl.
CPC .......... *G10L 15/063* (2013.01); *G10L 15/187* (2013.01); *G10L 15/22* (2013.01); *G10L 15/30* (2013.01); *G10L 2015/0635* (2013.01)

(58) Field of Classification Search
CPC ........ G06N 3/045; G06N 3/084; G06N 3/088; G06N 20/00; G06N 20/20; G10L 15/063;
(Continued)

(56) References Cited

U.S. PATENT DOCUMENTS

| 12,014,724 B2* | 6/2024 | Beaufays ............... G06N 3/045 |
| 2021/0117780 A1 | 4/2021 | Malik |
| 2022/0270590 A1 | 8/2022 | Beaufays |

FOREIGN PATENT DOCUMENTS

| CN | 1751309 | 3/2006 |
| CN | 111291897 | 6/2020 |

OTHER PUBLICATIONS

Saeed, A. et al., "Federated Self-Supervised Learning of Multisensor Representations for Embedded Intelligence;" IEEE Internet of Things Journal, vol. 8, No. 2; 11 pages; Jul. 15, 2020.

(Continued)

*Primary Examiner* — Angela A Armstrong
(74) *Attorney, Agent, or Firm* — Gray Ice Higdon

(57) ABSTRACT

Implementations disclosed herein are directed to unsupervised federated training of global machine learning ("ML") model layers that, after the federated training, can be combined with additional layer(s), thereby resulting in a combined ML model. Processor(s) can: detect audio data that captures a spoken utterance of a user of a client device; process, using a local ML model, the audio data to generate predicted output(s); generate, using unsupervised learning locally at the client device, a gradient based on the predicted output(s); transmit the gradient to a remote system; update weight(s) of the global ML model layers based on the gradient; subsequent to updating the weight(s), train, using supervised learning remotely at the remote system, a combined ML model that includes the updated global ML model layers and additional layer(s); transmit the combined ML model to the client device; and use the combined ML model to make prediction(s) at the client device.

19 Claims, 9 Drawing Sheets

(51) Int. Cl.
*G10L 15/22* (2006.01)
*G10L 15/30* (2013.01)

(58) Field of Classification Search
CPC ....... G10L 15/16; G10L 15/187; G10L 15/22; G10L 15/30; G10L 2015/0635; G06F 18/217; H04L 67/10
See application file for complete search history.

(56) References Cited

OTHER PUBLICATIONS

Intellectual Property India; Examination Report issued in Application No. 202327003163; 9 pages; dated Jul. 21, 2023.
McMahan, H.B. et al., "Communication-Efficient Learning of Deep Networks from Decentralized Data;" Cornell University, arXiv.org; arXiv:1602.05629v3; 11 pages; dated Feb. 28, 2017.
Chung, Y-A. et al., "Generative Pre-Training for Speech with Autoregressive Predictive Coding;" in IEEE International Conference on Acoustics, Speech and Signal Processing (ICASSP); pp. 3497-3501; May 4, 2020.
European Patent Office; International Search Report and Written Opinion of Ser. No. PCT/US2020/042806; 14 pages; dated Apr. 16, 2021.
European Patent Office; Communication pursuant to Article 94(3) EPC issued in Application No. 20753610.3, 8 pages; dated Oct. 2, 2024.
China National Intellectual Property Administration; Notification of Frist Office Action issued in Application No. 202080104721.0; 20 pages; dated Jun. 21, 2024.
China National Intellectual Property Administration; Notification of Second Office Action issued in Application No. 202080104721.0; 12 pages; dated Dec. 5, 2024.
China National Intellectual Property Administration; Notice of Grant issued in application No. 202080104721.0; 4 pages; dated Apr. 11, 2025.

* cited by examiner

UNSUPERVISED FEDERATED LEARNING OF MACHINE LEARNING MODEL LAYERS

BACKGROUND

Federated learning of machine learning model(s) is an increasingly popular machine learning technique for training of machine learning model(s). In traditional federated learning, a local machine learning model is stored locally on a client device of a user, and a global machine learning model, that is a cloud-based counterpart of the local machine learning model, is stored remotely at a remote system (e.g., a cluster of servers). Further, these machine learning models are traditionally bootstrapped using The client device, using the local machine learning model, can process user input detected at the client device to generate predicted output, and can compare the predicted output to ground truth output to generate a gradient using supervised learning techniques. Further, the client device can transmit the gradient to the remote system. The remote system can utilize the gradient, and optionally additional gradients generated in a similar manner at additional client devices, to update weights of the global machine learning model.

Further, the remote system can transmit the global machine learning model, or updated weights of the global machine learning model, to the client device. The client device can then replace the local machine learning model with the global machine learning model, or replace the weights of the local machine learning model with the updated weights of the global machine learning model, thereby updating the local machine learning model. The local and global machine learning models often each include a feature extractor portion combined with additional layers. The combined model can optionally be pre-trained, using proxy data, prior to its utilization in federated learning. Any pre-training can occur at the remote system (or an additional remote system), and uses supervised learning and without use of any gradients generated by client devices. This pre-training is generally based on proxy or biased data that may not reflect data that will be encountered when the machine learning model is deployed, thereby resulting in poor performance of the machine learning model.

SUMMARY

Some implementations disclosed herein are directed to unsupervised (or self-supervised) federated learning of machine learning ("ML") model layers. The ML model layers can be trained at a remote system based on gradient(s) that are generated locally at client device(s) using unsupervised (or self-supervised) learning techniques, and that are transmitted to the remote system. The ML model layers can optionally be further trained at the remote system based on additional gradient(s) that are generated remotely at the remote system using unsupervised (or self-supervised) learning techniques, and that are generated based on publicly available data. Some implementations disclosed herein are additionally or alternatively directed to, after training of the ML model layers, combining the ML model layers with additional upstream layer(s), thereby resulting in a combined machine learning model. Some of those implementations are further directed to training the combined machine learning model (e.g., at least the additional upstream layer(s) thereof) at the remote system using supervised learning techniques. Accordingly, various implementations disclosed herein seek to first train ML model layers using unsupervised (or self-supervised) federated learning, combine the trained ML model layers with additional upstream layer(s) to generate a combined model, then train the combined model using supervised learning, such as non-federated supervised learning performed at remote system(s). Notably, this is in contrast with alternate techniques that pre-train the upstream layers using supervised learning and/or without utilization of federated learning, combine the pre-trained ML model layers with additional layer(s) to generate a combined model, then use federated learning only in training the combined model.

In some implementations, the ML model layers are used in processing audio data. For example, the ML model layers can be used in processing Mel-filterbank features of the audio data and/or other representation(s) of the audio data. In some of those implementations, in generating a gradient at a client device, the client device can: detect, via corresponding microphone(s), audio data that captures a spoken utterance of a corresponding user of the client device; process the audio data (e.g., features thereof), using a local machine learning model that includes ML model layers that correspond to global ML model layers and that are used in generating an encoding of the audio data, to generate predicted output(s); and generate, using unsupervised (or self-supervised) learning, the gradient based on the predicted output(s). The local machine learning model can include, for example, an encoder-decoder network model ("encoder-decoder model"), a deep belief network ("DBN model"), a generative adversarial network model ("GAN model"), a cycle generative adversarial network model ("CycleGAN model"), a transformer model, a prediction model, other machine learning model(s) that include ML model layers used in generating an encoding of the audio data, and/or any combination thereof. Moreover, the ML model layers used in generating an encoding of the audio data can be a portion of one of those models (e.g., all or a portion of the encoder in an encoder-decoder model), and, as mentioned above, corresponds to (e.g., has the same structure as) the global ML model layers. As one non-limiting example, if the local machine learning model is an encoder-decoder model, then the portion used in generating an encoding of the audio data can be the encoder portion, or downstream layers, of the encoder-decoder model. As another non-limiting example, if the local machine learning model is a GAN model or a CycleGAN model, then the portion used in generating an encoding of the audio data can be a real-to-encoding generator model of the GAN model or the CycleGAN model. Although the preceding examples are described with respect to ML model layers that are used to process data to generate an encoding of that data, the ML model layers can alternatively be used to process data to generate output that is of the same dimensions as (or even higher-dimension than) the processed data. For example, the input layer of the ML model layers can have certain dimensions and the output layer of the ML model can also have the same certain dimensions. As one particular example, the ML model layers can be one or more downstream layers of the local machine learning model and output generated using those ML model layers can be provided to an upstream encoder-decoder portion of the local machine learning model.

In some versions of those implementations, generation of the gradient can be based on the predicted output(s) generated across the local machine learning model given the audio data that captures the spoken utterance of the corresponding user of the client device(s). As one non-limiting example, assume that the local machine learning model is an encoder-decoder model and the encoder portion is used in generating the encoding of the audio data, and the decoder portion is used in processing the encoding of the audio data in attempting to reconstruct the audio data. In this example, the predicted output(s) can be predicted audio data that is generated by processing the encoding of the audio data using the decoder portion, and that seeks to correspond to the audio data based on which the encoding is generated. Put another way, the predicted output(s) generated using the encoder-decoder model can be predicted audio data that is generated using the decoder and that seeks to correspond to the spoken utterance. Accordingly, the client device can determine a difference between the audio data and the predicted audio data. For example, the client device can determine a difference between the audio data and the predicted audio data, such as a difference that is based on comparing analog audio waveforms thereof, a difference between representations of the audio data and the predicted audio data in a latent space, a difference that is based on comparing features of the audio data and of the predicted audio data that are deterministically computed (e.g., Mel-filterbank features thereof, Fourier transforms thereof, Mel-cepstral frequency coefficients thereof, and/or other representations of the audio data and the predicted audio data). In some implementations that determine the difference between the representations of the audio data and the predicted audio data in the latent space, more useful features can be extracted therefrom as compared to determining the difference based on comparing raw audio data. Further, the client device can generate the gradient based on the determined difference between the audio data and the predicted audio data.

As another non-limiting example, assume the spoken utterance includes a first portion of audio data and a second portion of the audio data that follows the first portion of the audio data. Further assume that the local machine learning model is an encoder-prediction model, the encoder portion is used in generating an encoding of the first portion, and the prediction portion is used in processing the encoding in generating a predicted second portion of the audio data. In this example, the predicted output(s) can be the predicted second portion of the audio data, which seeks to correspond to the actual second portion of the audio data of the spoken utterance of the corresponding user of the client device(s). Put another way, the encoder-prediction model can be used to process the first portion of audio data and generate a predicted second portion of the audio data that seeks to correspond to the actual second portion of the audio data. Accordingly, the client device(s) can determine a difference between the actual second portion of the audio data and the predicted second portion of the audio data in a similar manner described in the previous example. Further, the client device(s) can generate the gradient(s) based on the determined difference between the actual second portion of the audio data and the predicted second portion of the audio data. Notably, each of the client device(s) can generate corresponding gradient(s) in this manner, and can transmit the corresponding gradient(s) to the remote system.

In some versions of those implementations, transmitting of the gradient(s) from the client device(s) to the remote system is in response to the client device(s) determining one or more conditions are satisfied. The one or more conditions can include, for example, that the client device has authorized transmitting of the gradient(s), that the client device is charging, that the client device has at least a threshold state of charge, that a temperature of the client device (based on one or more on-device temperature sensors) is less than a threshold, that the client device is not being held by a user, temporal condition(s) associated with the client device(s) (e.g., between a particular time period, every N hours or says, where N is a positive integer, and/or other temporal condition(s) associated with the client device(s)), whether a threshold number of gradient(s) have been generated by a given one of the client device(s), and/or other condition(s). For example, in response to given one of the client device(s) determining that it is in a charging state, and in response to the given one of the client device(s) determining a current time at a location of the given one of the client device(s) is between 2:00 AM and 5:00 AM, then the given one of the client device(s) may transmit the corresponding gradient(s) to the remote system. As another example, in response to a given one of the client device(s) determining one or more corresponding gradients have been generated, and in response to the given one of the client device(s) determining it last transmitted gradient(s) to the remote system seven days ago, then the given one of the client device(s) may transmit the one or more corresponding gradient(s) to the remote system assuming that the given one of the client device(s) has authorized transmitting of the gradient(s). In various implementations, the client device(s) determine whether the one or more conditions are satisfied in response to the remote system requesting the gradient(s). For example, if a given one of the client device(s) determines that the one or more conditions are satisfied in response to receiving a request for gradient(s) from the remote system, then the given one of the client device(s) may transmit the gradient(s). However, if the one or more conditions(s) are not satisfied, then the given one of the client device(s) may refrain from transmitting the gradient(s) to the remote system.

In some of those implementations, the remote system can receive the gradient(s) from the client devices, and update one or more of the weights of the global ML model layers based on the gradient(s), thereby resulting in an updated global ML model layers. As noted above, the remote system can also optionally generate additional gradient(s) (i.e., remote gradient(s)) based on the publicly available data, using unsupervised (or self-supervised) learning techniques, and optionally utilize the additional gradient(s) in updating one or more of the weights of the global ML model layers. In some versions of those implementations, the additional gradient(s) can be generated in a similar manner described above with respect to the client device(s). However, rather than generating the gradient(s) based on processing, using the local machine learning model(s), audio data that captures spoken utterance(s) at the client device(s), the remote system can generate the additional gradient(s) by processing, using global machine learning model(s) (e.g., global version(s) of the local machine learning model(s)), additional audio data that is captured in publicly available resources (e.g., from a video-sharing platform, an audio-sharing platform, an image-sharing platform, and/or any non-access restricted publicly available resource. Spoken utterance(s) of the corresponding user(s), the global ML model layers are updated using diverse data, thereby resulting in more robust global ML model layers than if the global ML model layers were to be updated based solely on the spoken utterance(s) of the corresponding user(s). For instance, the global ML model layers can be updated to generate richer feature representations of speech since it is not overly biased towards spoken utterances that are commonly received at the client device(s).

In some further versions of those implementations, the remote system can assign the gradient(s) and/or the additional gradient(s) to specific iterations of updating of the global ML model layers. The remote system can assign the gradient(s) and/or the additional gradient(s) to the specific iterations based on one or more criteria. The one or more criteria can include, for example, a threshold quantity of the gradient(s) and/or the additional gradient(s), a threshold duration of time of updating using the gradient(s) and/or the additional gradient(s), and/or other criteria. In yet further versions of those implementations, the remote system can assign the gradient(s) to various subsets for the specific iterations. Each of the subsets can optionally include gradient(s) from at least one unique client device that is not included in another one of the subsets. As one non-limiting example, the remote system can update the global ML model layers using 100 gradients received from a first subset of the client device(s), followed by 100 gradients generated at the remote system based on the publicly available resources, followed by another 100 gradients received from a second subset of the client device(s), and so on. As another non-limiting example, the remote system can update the global ML model layers for an hour based on gradients received from the client device(s), followed by an hour based on gradients generated at the remote system based on the publicly available resources, followed by another hour of gradients received from the client device(s), and so on. Notably, these threshold quantities and/or durations of time can vary between the gradient(s) that are received from the client device(s) and the additional gradient(s) that are generated at the remote system.

In some versions of those implementations, subsequent to training the global ML model layers, the remote system can combine the global ML model layers with additional layer(s) to generate combined machine learning model(s). The additional layer(s) can correspond to, for example, downstream layer(s) for voice activity detection model(s), hotword detection model(s), speech recognition model(s), continued conversation model(s), hotword free detection model(s), gaze detection model(s), mouth movement detection model(s), object detection model(s), object classification model(s), facial recognition model(s), and/or other machine learning model(s). Notably, the same global ML model layers may be combined with additional layer(s) of multiple disparate types of machine learning model(s), thereby resulting in multiple disparate combined machine learning model(s) that utilize the same global ML model layers. It is also noted that the additional layer(s) of the combined machine learning model can differ structurally from those of the local machine learning model utilized in generating gradients for federated learning of the global ML model layers. For example, the local machine learning model can be an encoder-decoder model, with the encoder portion corresponding structurally to the global ML model layers. The combined machine learning model includes the global ML model layers that correspond structurally to the encoder portion, but the additional layer(s) of the combined machine learning model can differ structurally from the decoder portion of the local machine learning model. For example, the additional layer(s) can include more or fewer layers than the decoder portion, different connection(s) between layer(s), different output dimension(s), and/or different type(s) of layer(s) (e.g., recurrent layer(s) instead of feedforward layer(s)).

Moreover, the remote system can train the combined machine learning model(s) using supervised learning techniques. For instance, a given combined machine learning model can be trained using identified supervised training instances (i.e., having labeled ground truth output(s)). Each of the supervised training instances can be identified based on an end goal for which the given combined machine learning model is being trained. As one non-limiting example, assuming that the given combined machine learning model is being trained as a speech recognition model, the identified supervised training instances can correspond to training instances for training the speech recognition model. Accordingly, in this example, the global ML model layers of the speech recognition model can process training instance input (e.g., audio data correspond to speech) to generate a feature representation corresponding to the training instance input, and the additional layer(s) of the given speech recognition model can process the feature representation corresponding to the speech to generate predicted output(s) (e.g., predicted phoneme(s), predicted token(s), and/or recognized text corresponding to the speech of the training instance input). The predicted output(s) can be compared to training instance output (e.g., ground truth phoneme(s), token(s), and/or text corresponding to the speech), and can be backpropagated across the speech recognition model that includes the global ML model layers and the additional layer(s) of the given speech recognition model and/or used to update weights of only the additional layer(s) of the combined machine learning model. The process can be repeated using a plurality of training instances to train the speech recognition model. Further, this process can be repeated using corresponding training instances to generate other combined machine learning model(s) (e.g., for voice activity detection, hotword detection, continued conversation, hotword free invocation, gaze detection, mouth movement detection, object detection model(s), object classification model(s), facial recognition, and/or other model(s)).

In some versions of those implementations, once the combined machine learning model(s) are trained at the remote system, the remote system can transmit the trained combined machine learning model(s) back to the client device(s). The client device(s) can utilize the trained machine learning model(s) to make prediction(s) based on user input(s) detected at the client device(s) of the corresponding user(s) that receive the combined machine learning model(s). The prediction(s) may be based on the additional layer(s) that are combined with the updated global ML model layers that is transmitted to the client device(s). As one non-limiting example, assume the additional layer(s) are those of a speech recognition model, and the combined machine learning model is trained using speech recognition training instances. In this example, the user input at the client device(s) can be spoken utterance(s), and the prediction(s) made at the client device(s) can be predicted phoneme(s) that is generated by processing the spoken utterance(s) using the combined machine learning model. As another non-limiting example, assume the additional layer(s) are those of a hotword detection model, and the combined machine learning model is trained using hotword detection training instances. In this example, the user input at the client device(s) can be spoken utterance(s) that include hotword(s), and the prediction(s) made at the client device(s) can include an indication of whether the spoken utterance(s) include hotword(s) that is generated by processing the spoken utterance(s) using the combined machine learning model. In some further versions of those implementations, the remote system may also transmit the updated global ML model layers to the client device(s) to replace the portion used by the local machine learning model(s) to generate the encoding of the audio data.

In various implementations, the global ML model layers can be continuously updated based on gradient(s) generated using unsupervised (or self-supervised) learning techniques as described herein, resulting in updated global ML model layers. Further, the global ML model layers can be combined with the additional layer(s) of the other machine learning model(s) as described herein, resulting in updated combined machine learning model(s). Moreover, the updated combined machine learning model(s) can be trained using supervised learning techniques as described herein. The updated combined machine learning model(s) may then be transmitted to the client device(s), and stored locally on the client device(s) (and optionally replacing of a corresponding one of the combined machine learning model(s) at the client device(s) if one exists) for subsequent use by the client device(s). In some additional and/or alternative implementations, the global ML model layers of an existing one of the combined machine learning model(s) can be replaced with the updated global ML model layers, thereby resulting in a modified combined machine learning model(s). The modified combined machine learning model(s) may then be transmitted to the client device(s) to replace a corresponding one of the combined machine learning model(s) at the client device(s).

By first training the global ML model layers in this manner and then combining it in with the additional layer(s) of the other machine learning model(s), the resulting combined machine learning model(s) can be trained more efficiently. For example, training the global ML model layers using unsupervised (or self-supervised) federated learning, as described herein, can result in global ML model layers that can be used to generate rich encodings for a variety of spoken utterance features. For example, when the feature extractor model is used to process audio data, using gradients from various disparate client devices in training the global ML model layers results in training based on gradients that are generated based on audio data with varied speech from different users, audio data with different background noise conditions, and/or audio data generated by different client device microphone(s) (which can have different properties and result in different acoustic features), etc. This can result in the global ML model layers, once trained, being usable to generate richer and/or more robust encodings for multiple disparate applications (e.g., speech recognition, hotword detection, dictation, voice activity detection, and so on). Further, implementations that additionally train based on gradients from publicly available audio data can prevent the feature extractor from being overly biased toward certain term(s) and/or certain style(s) of speech. This can also result in the global ML model layers, once trained, being usable to generate richer and/or more robust encodings.

Such rich and/or robust encodings can enable the resulting combined machine learning model to converge more quickly during training. Such rich encodings can additionally and/or alternatively enable the resulting combined machine learning model to achieve high recall and/or high accuracy using a lesser quantity of training instances. In particular, the resulting combined machine learning model can achieve high recall and/or high accuracy using a lesser quantity of labeled training instances when the updated global ML model layers is combined with the additional layer(s) since the updated global ML model layers is updated based on unlabeled data without any direct supervision. Moreover, by training the global ML model layers using unsupervised (or self-supervised) learning, the training of the global ML model layers can be more computationally efficient in the sense that the need to label training instances is obviated. Further, the need for any on-device supervision from user corrections or user actions, which may be difficult or impossible to obtain, is also obviated.

Although various implementations above are described with respect to processing audio data and/or speech processing, it should be understood that is for the sake of illustration and is not meant to be limiting. As described in detail herein, the techniques described herein can additionally or alternatively be applied for global ML model layers that can be used to process additional and/or alternative types of data and generate corresponding encodings. For example, techniques can be utilized for image processing such that the global ML model layers can be trained to generate encoding of image(s). For instance, assume the local machine learning model is an encoder-decoder model that includes an encoder portion that is used to generate an encoding based on image data generated at a given one of the client device(s), and a decoder portion that is used to reconstruct the image based on the encoding of the image data, thereby resulting in predicted image data that corresponds to the image. The given one of the client device(s) can compare the image data to the predicted image data to generate a gradient using unsupervised (or self-supervised) learning, and transmit the gradient to the remote system. The remote system can update one or more weights of the global ML model layers based on the gradient (and additional gradient(s) from the client device(s) and/or remote gradients), and can combine the global ML model layers with additional layer(s) of a given image processing machine learning model, thereby resulting in a combined machine learning model for image processing. The remote system can further train the combined machine learning model using supervised learning, and transmit the combined machine learning model for image processing to the client device(s). For example, the combined machine learning model can be one trained for predicting location(s) of object(s) in images, classification of object(s) in image(s), image captioning of image(s), and/or other prediction(s).

As such, the above description is provided as an overview of some implementations of the present disclosure. Further description of those implementations, and other implementations, are described in more detail below.

DETAILED DESCRIPTION

Figure 1A:
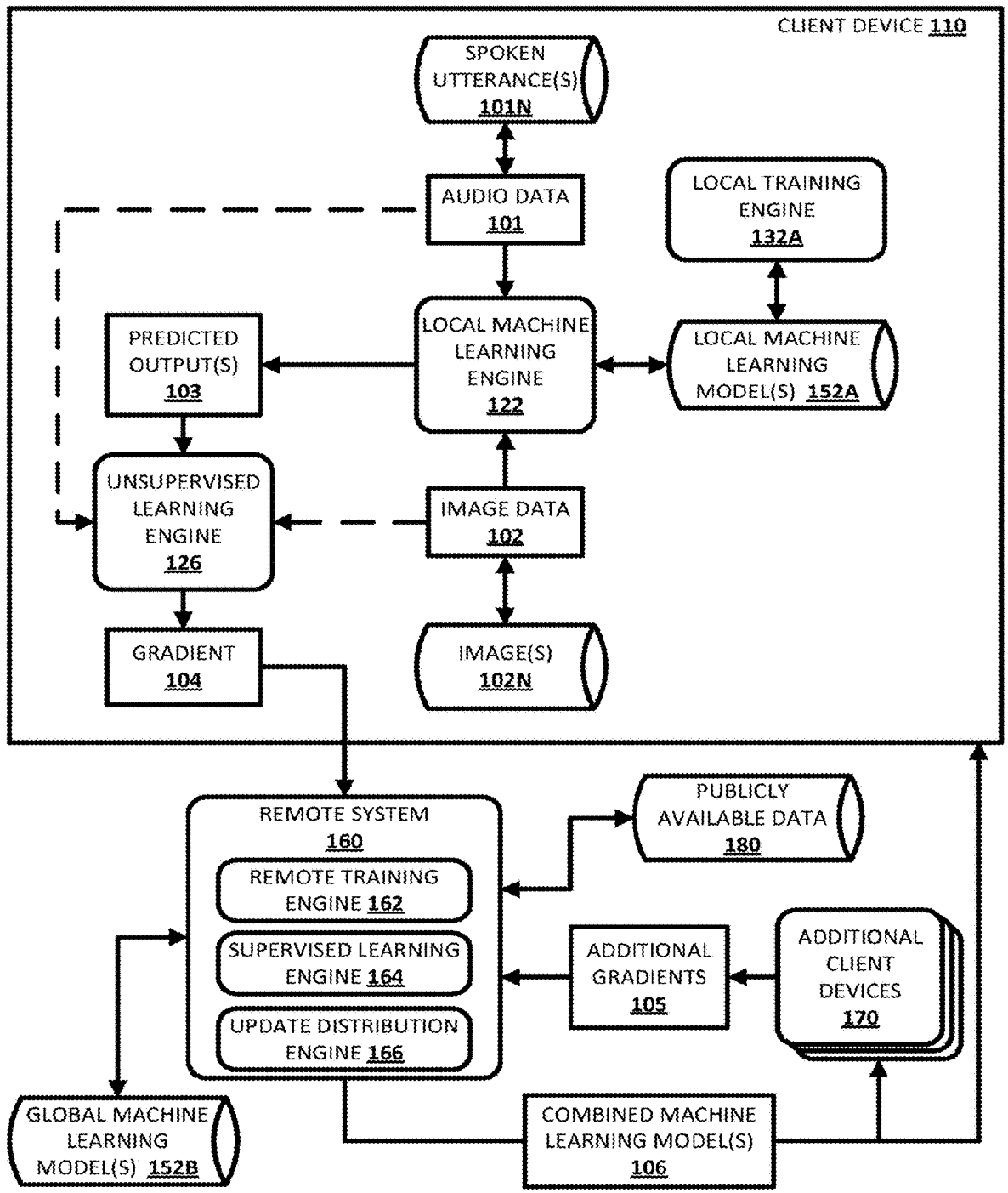
FIG. 1A, FIG. 1B, FIG. 1C, and FIG. 1D depict example process flows that demonstrate various aspects of the present disclosure, in accordance with various implementations.

FIGS. 1A-1D depict example process flows that demonstrate various aspects of the present disclosure. A client device 110 is illustrated in FIG. 1A, and includes the components that are encompassed within the box of FIG. 1A that represents the client device 110. Local machine learning engine 122 can detect audio data 101 corresponding to a spoken utterance detected via one or more microphones of the client device 110 (or stored in spoken utterance(s) database 101N) and/or can detect image data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110 (or stored in image(s) database 102N). The one or more non-microphone sensors can include vision component(s), proximity sensor(s), pressure sensor(s), and/or other sensor(s) capable of generating the image data 102. The local machine learning engine 122 processes the audio data 101 and/or the image data 102, using local machine learning model(s) 152A, to generate predicted output(s) 103.

The local machine learning model(s) 152A can include, for example, an encoder-decoder network model ("encoder-decoder model"), a deep belief network ("DBN model"), a generative adversarial network model ("GAN model"), a cycle generative adversarial network model ("CycleGAN model"), a transformer model, a prediction model, other machine learning model(s) that include machine learning model layers used, by the local machine learning engine 122, in processing Mel-filterbank features the audio data 101, other representations of the audio data 101, representations of the image data 102, and/or any combination thereof. Notably, the machine learning model layers of the local machine learning model(s) 152A can be used in generating an encoding of the audio data 101 and/or the image data 102, or feed into downstream layers that generate the encoding of the audio data. Moreover, it is noted that the portion corresponds structurally to global machine learning model(s) 152B (described below). Further, an additional portion of the local machine learning model(s) be used in generating the predicted output 103 based on the encoding of the audio data 101 and/or the image data 102. For example, if a given local machine learning model utilized by the local machine learning engine 122 is an encoder-decoder model, then the portion used in generating the encoding of the audio data 101 and/or the image data 102 can be the encoder portion, or downstream layers, of the encoder-decoder model, and the additional portion used in generating the predicted output 103 can be the decoder portion of the encoder-decoder model. As another example, if a given local machine learning model utilized by the local machine learning engine 122 is an CycleGAN model, then the portion used in generating the encoding of the audio data 101 and/or the image data 102 can be an real-to-encoding generator portion of the CycleGAN model, and the additional portion used in generating the predicted output 103 can be an encoding-to-real generator portion of the CycleGAN model.

Figure 6:
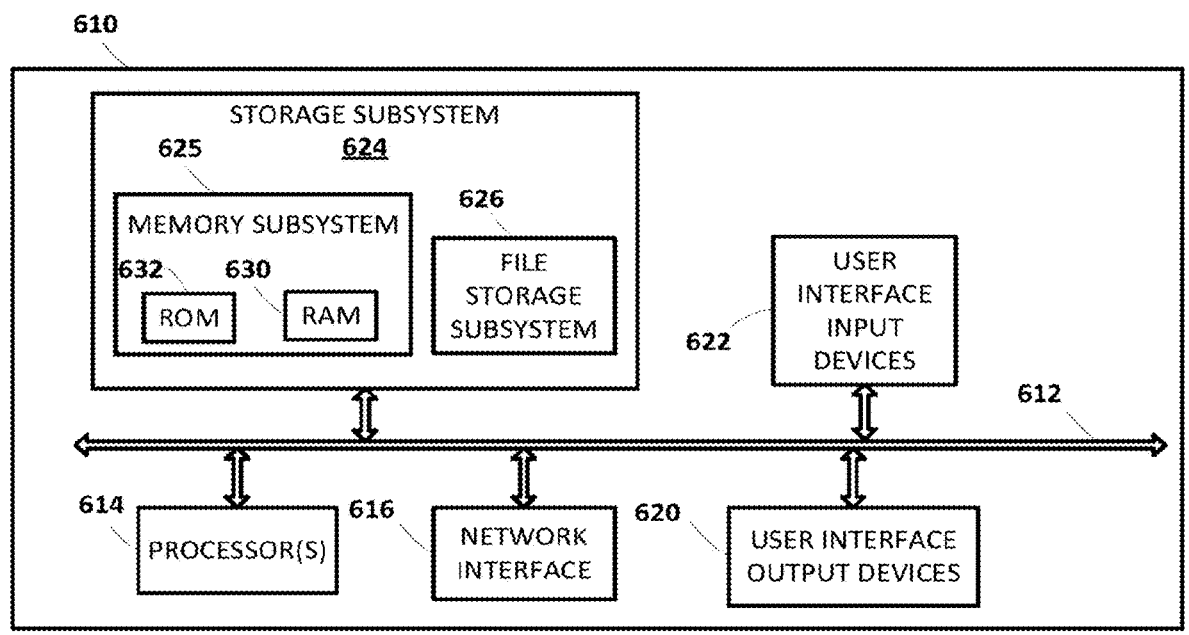
FIG. 6 depicts an example architecture of a computing device, in accordance with various implementations.

In some implementations, when the local machine learning engine 122 generates the predicted output 103, it can be stored locally on the client device in on-device storage (not depicted), and in association with the corresponding audio data 101 and/or the image data 102, for a threshold amount of time (e.g., days, weeks, months, etc.). This allows the corresponding audio data and/or the image data 102 to be processed on the client device 110 various times over the threshold amount of time to generate corresponding predicted outputs. In some versions of those implementations, the predicted output 103 can be retrieved by unsupervised learning engine 126 for utilization in generating a gradient 104 at a later time, such as when one or more conditions described herein are satisfied. The unsupervised learning engine 126 can generate the gradient 104 locally at the client device 110 using unsupervised learning techniques as described in greater detail herein (e.g., with respect to FIGS. 1B and 1C). These unsupervised learning techniques may also be considered "self-supervised" learning techniques in that the unsupervised learning engine 126 learns to extract certain features from the audio data 101, the image data 102, and/or other data generated locally at the client device 110. Further, the on-device storage can include, for example, read-only memory (ROM) and/or random-access memory (RAM) (e.g., as depicted in FIG. 6). In other implementations, the predicted output 103 can be provided to the unsupervised learning engine 126 in real-time.

Figure 1B:
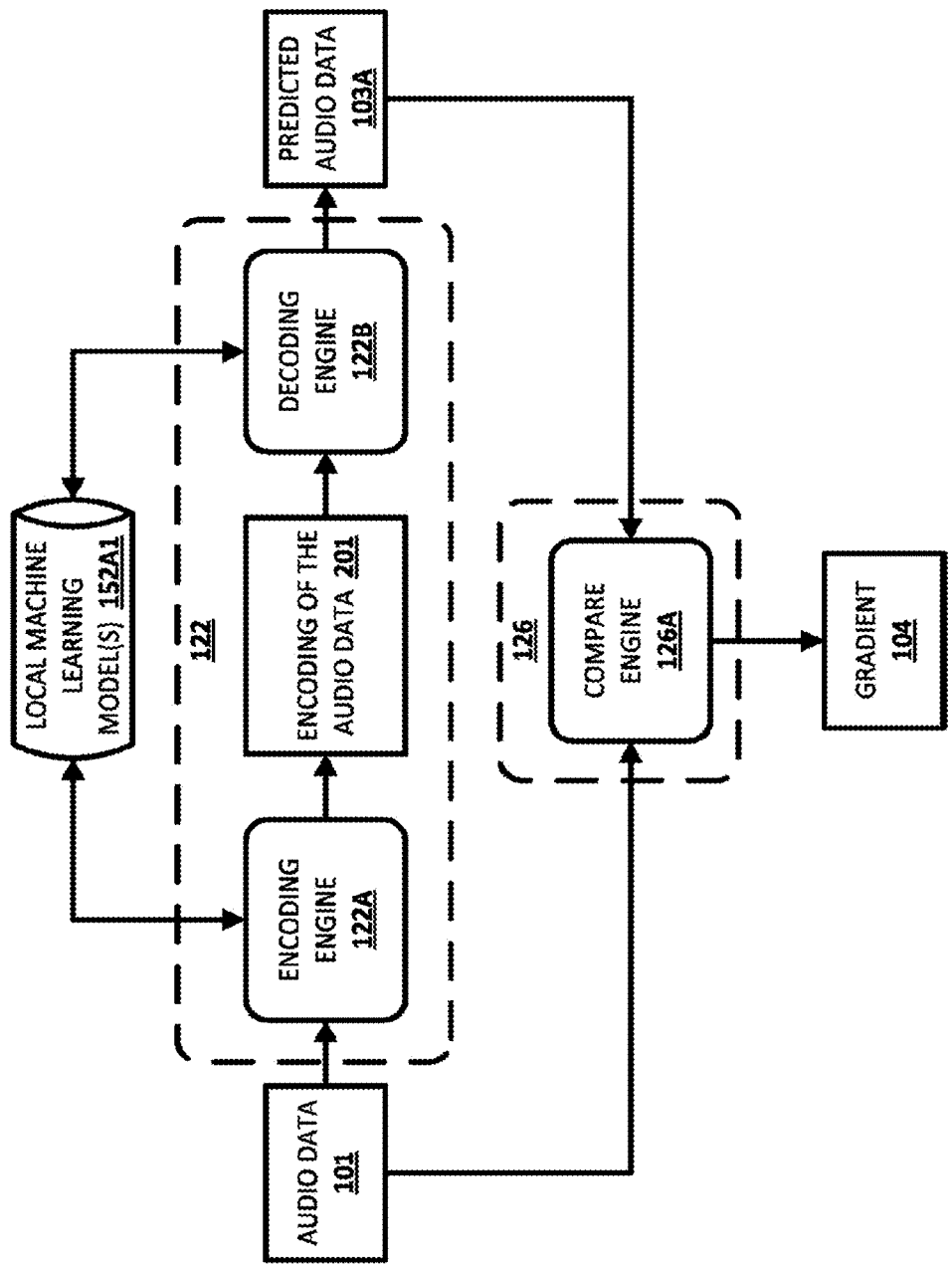

In various implementations, generating of the gradient 104 can be based on the predicted output 103 generated across the local machine learning engine 122 given the audio data 101 and/or the image data 102. In some implementations, and as depicted in FIG. 1B, the predicted output 103 can be predicted audio data 103A. In some versions of those implementations, the local machine learning engine 122 can process the audio data 101, using an encoding engine 122A, to generate an encoding of the audio data 201. Further, the local machine learning engine 122 can process the encoding of the audio data 201, using a decoding engine 122B to generate the predicted audio data 103A. The encoding engine 122A and the decoding engine 122B can be portions of one or more machine learning models stored in the local machine learning model(s) database 152A1. Further, the encoding of the audio data 201 can be a feature representation of the audio data such as, for example, a tensor of values, such as a vector or matrix of real numbers that is optionally in a reduced dimensionality space whose dimensions are reduced relative to the dimensions of the audio data. As a non-limiting example, the encoding of the audio data 201 can be a vector of 128 values, such as values that are each a real number from 0 to 1. As another non-limiting example, the encoding of the audio data can be a 2 by 64 matrix of values or a 3 by 64 matrix of values. For example, the encoding engine 122A can utilize an encoder portion of an encoder-decoder model to generate the encoding of the audio data 201, and the decoding engine 122B can utilize a decoder portion of the encoder-decoder model to generate the predicted audio data 103A. As another example, the encoding engine 122A can utilize a real-to-encoding generator portion of a CycleGAN model to generate the encoding of the audio data 201, and the decoding engine 122B can utilize an encoding-to-real generator portion of the Cycle-GAN model to generate the predicted audio data 103A.

Notably, as shown in FIG. 1B, the predicted audio data 103A seeks to correspond to the audio data 101 based on processing of the encoding of the audio data 201. Put another way, the encoding engine 122A generates an intermediate representation of the audio data 101 (e.g., the encoding of the audio data 201), and the decoding engine 122B seeks to reconstruct the audio data 101 from this intermediate representation in generating the predicted audio data 103A. Accordingly, assuming there is no error in the encoding and decoding by the local machine learning engine 122, there should be little to no variance between the audio data 101 and the predicted audio data 103A.

The unsupervised learning engine 126 can then process, using unsupervised learning, the audio data 101 and the predicted audio data 103A to generate the gradient 104. Notably, in using unsupervised learning, there is no labeled data (i.e., no ground truth output) to compare to the audio data 101. Rather, the unsupervised learning engine 126 can utilize a compare engine 126A to directly compare the audio data 101 and the predicted audio data 103A to determine a difference therebetween, and the unsupervised learning engine 126 can generate the gradient 104 based on the difference. For example, the compare engine 126A can compare an audio waveform corresponding to the audio data 101 and a predicted audio waveform corresponding to the predicted audio data 103A to determine the difference between the audio data 101 and the predicted audio data 103A, and the unsupervised learning engine 126 can generate the gradient 104 based on the difference. As another example, the compare engine 126A can compare features of the audio data 101 and of the predicted audio data 103A that are deterministically computed (e.g., Mel-filterbank features thereof, Fourier transforms thereof, Mel-cepstral frequency coefficients thereof, and/or other representations of the audio data and the predicted audio data) to determine a difference therebetween, and the unsupervised learning engine 126 can generate the gradient 104 based on the difference. Accordingly, the compare engine 126A can utilize any technique to compare the audio data 101 and the predicted audio data 103A to determine the difference therebetween, and the unsupervised learning engine can generate the gradient 104 based on the difference.

Although FIG. 1B is described herein with respect to generating the gradient 104 based on the audio data 101, it should be understood that is for the sake of example and is not meant to be limiting. As one non-limiting example, the gradient 104 can additionally or alternatively be generated based on the image data 102. For instance, the encoding engine 122A can process the image data 102 to generate an encoding of the image data, and the decoding engine 122B can process the encoding of the image data to generate predicted image data in a similar manner described above. The encoding of the image data can be a feature representation of the image data such as, for example, a tensor of values, such as a vector or matrix of real numbers that is optionally in a reduced dimensionality space whose dimensions are reduced relative to the dimensions of the image data. As a non-limiting example, the encoding of the image data can be a vector of 128 values, such as values that are each a real number from 0 to 1. As another non-limiting example, the encoding of the image data can be a 2 by 64 matrix of values or a 3 by 64 matrix of values. The decoding engine 122B can process the encoding of image data to generate predicted image data. The compare engine 126A can then compare the image data 102 and the predicted image data, or features thereof, to determine a difference therebetween, and the unsupervised learning engine 126 can generate the gradient based 104 on the difference. In implementations where gradients are generated based on both the audio data 101 and the image data 102, the gradients can be indexed based on whether they correspond to the audio data 101 and/or the image 102. This allows weights of various global machine learning model layers to be updated based on one of audio-based gradients or image-based gradients, or weights of a single global machine learning model layer to be updated based on both the audio-based gradients and the image-based gradients.

Figure 1C:
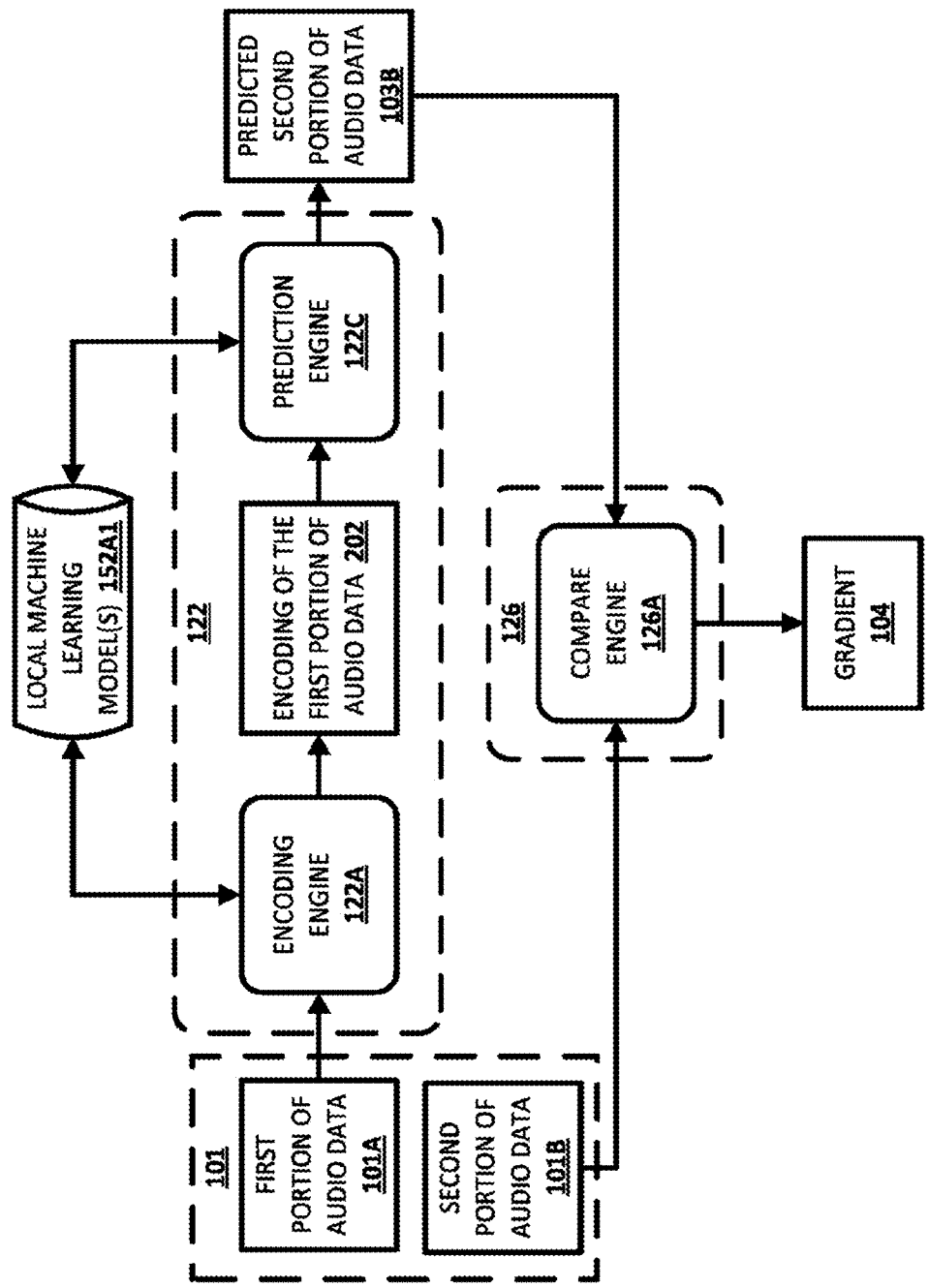

In some additional and/or alternative implementations, and as depicted in FIG. 1C, the predicted output 103 can be a predicted second portion of audio data 103B. Notably, as shown in FIG. 1C, the audio data 101 is segmented into a first portion of audio data 101A and a second portion of audio data 101B that temporally follows the first portion of audio data 101B. In some versions of those implementations, the first portion of audio data 101A can be a first portion of a spoken utterance (e.g., "What's the weather . . . ") and the second portion of audio data 101B can be a second portion of the same spoken utterance that immediately follows the first portion of audio data 101B (e.g., " . . . in Louisville, KY"), whereas in other versions of those implementations, the first portion of audio data 101A can be a first spoken utterance (e.g., "What's the weather in Louisville, KY") and the second portion of audio data 101B can be a second spoken utterance that immediately follows the first spoken utterance (e.g., "How about in Lexington, KY").

In some versions of those implementations, the local machine learning engine 122 can process the first portion of audio data 101A, using the encoding engine 122A, to generate an encoding of the first portion of audio data 202 in a similar manner described above with respect to FIG. 1B. However, in contrast with FIG. 1B, the local machine learning engine 122 can process the encoding of the first portion of audio data 202, using a prediction engine 122C, rather than the decoding engine 122B, to generate the predicted second portion of audio data 103B. The prediction engine 122C can utilize one or more prediction models that are also stored in the local machine learning model(s) database 152A1 to generate the predicted second portion of audio data 103B. Similar to the encoding of the audio data 201 in FIG. 1B, the encoding of the first portion of audio data 202 can be a feature representation of the audio data such as, for example, a tensor of values, such as a vector or matrix of real numbers that is optionally in a reduced dimensionality space whose dimensions are reduced relative to the dimensions of the audio data. As a non-limiting example, the encoding of the audio data 201 can be a vector of 128 values, such as values that are each a real number from 0 to 1. As another non-limiting example, the encoding of the audio data can be a 2 by 64 matrix of values or a 3 by 64 matrix of values. Further, the prediction engine 122C can select a given one of the one or more prediction models based on the encoding of the first portion of audio data 202. For example, if the encoding of the first portion of audio data 202 includes one or more tokens that correspond to the first portion of audio data 101A, then the prediction engine 122C may utilize a first prediction model to generate the predicted second portion of audio data 103B. In contrast, if the encoding of the first portion of audio data 202 includes one or more phonemes that correspond to the first portion of audio data 101A, then the prediction engine 122C may utilize a distinct, second prediction model to generate the predicted second portion of audio data 103B. The compare engine 126A can compare the second portion of audio data 101B and the predicted second portion of audio data 103B in the same manner described above with respect to FIG. 1B to determine a difference therebetween, and the unsupervised learning engine 126 can generate the gradient 104 based on the difference.

Although FIG. 1C is also described herein with respect to generating the gradient 104 based on the audio data 101, it should be understood that is for the sake of example and is not meant to be limiting. As one non-limiting example, the gradient 104 can be generated based on the image data 102. For instance, the encoding engine 122A can process the a first portion of the image data 102 (or a first image in a stream of images) to generate an encoding of the first portion of the image data, and the prediction engine 122C can process the encoding of the first portion of the image data to generate a predicted second portion of the image data in a similar manner described above. The compare engine 126A can compare the second portion of the image data 102 and the predicted second portion of the image data to determine a difference therebetween, and the unsupervised learning engine 126 can generate the gradient 104 based on the difference. Similar to FIG. 1B, in implementations where gradients are generated based on both the audio data 101 and the image data 102 in the manner described with respect to FIG. 1C, the gradients can also be indexed based on whether they correspond to the audio data 101 and/or the image 102.

Turning back to FIG. 1A, the client device 110 can then transmit the gradient 104 to a remote system 160 over one or more wired or wireless networks (e.g., Internet, WAN, LAN, PAN, Bluetooth, and/or other networks). In some implementations, the client device 110 can transmit the gradient 104 to the remote system 160 in response to determining one or more conditions are satisfied. The one or more conditions can include, for example, that the client device 110 has authorized transmitting of the gradient 104, that the client device 110 is charging, that the client device 110 has at least a threshold state of charge, that a temperature of the client device 110 (based on one or more on-device temperature sensors) is less than a threshold, that the client device is not being held by a user, temporal condition(s) associated with the client device(s) (e.g., between a particular time period, every N hours or says, where N is a positive integer, and/or other temporal condition(s) associated with the client device(s)), whether a threshold number of gradient(s) have been generated by a given one of the client device(s), and/or other condition(s). In this manner, the client device 110 can generate multiple gradients while the client device 110 monitors for satisfaction of one or more of the conditions. In some versions of those implementations, the client device 110 may transmit the gradient 104 to the remote system 160 in response to the remote system 160 requesting the gradient 104 from the client device 110, and in response to the client device 110 determining the one or more conditions are satisfied. In other implementations, the client device 110 can transmit the gradient 104 to the remote system 160 in response to the gradient 104 being generated.

In some additional and/or alternative implementations, the unsupervised learning engine 126 can optionally also provide the generated gradient 104 to local training engine 132A. The local training engine 132A, when it receives the generated gradient 104, uses the gradient 104 to update the one or more of the local machine learning models, or portions thereof, stored in the local machine learning model(s) database 152A. For example, the local training engine 132A can update one or more weights of one or more of the local machine learning models (or a subset of layers thereof) utilized in generating the gradient 104 as described in greater detail herein (e.g., with respect to FIGS. 1B and 1C). It is noted that, in some implementations, the local training engine 132A can utilize batch techniques to update one or more of the local machine learning models, or portions thereof, based on the gradient 104 and additional gradients determined locally at the client device 110 on the basis of further audio data and/or further image data.

As noted above, the client device 110 can transmit the generated gradient 104 to the remote system 160. When the remote system 160 receives the gradient 104, a remote training engine 162 of the remote system 160 uses the gradient 104, and additional gradients 105 from a plurality of additional client devices 170, to update one or more weights of global machine learning model layers stored in global machine learning model(s) database 152B. The additional gradients 105 from the plurality of additional client devices 170 can each be generated based on the same or similar technique as described above with respect to generating the gradient 104 (e.g., described with respect to FIGS. 1B and 1C), but on the basis of locally generated audio data and/or image data at a respective one of the plurality of additional client devices.

In some implementations, the remote system 160 can also generate remote gradients based on publicly available data stored in one or more publicly available data databases 180. The one or more publicly available data databases 180 can include any repository of data that is publicly available over one or more network(s), and that includes audio data, video data, and/or image data. For instance, the one or more publicly available data databases 180 can be an online video-sharing platform, image-sharing platform, and/or audio-sharing platform that is not access-restricted like the audio data 101 and the image data 102 generated locally at the client device 110 and/or stored locally on the client device 110. The remote gradients can each be generated remotely at the remote system 160 based on the same or similar technique as described above with respect to generating the gradient 104 (e.g., described with respect to FIGS. 1B and 1C), but on the basis of the publicly available data that is retrieved from one or more of the publicly available data databases 180. The remote gradients can also be utilized to update one or more weights of the global machine learning model layers stored in the global machine learning model(s) database 152B.

In some versions of those implementations, the remote training engine 162 can utilize the gradient 104, the additional gradients 105, and the remote gradients in updating one or more of the weights of the global machine learning model layers. The remote system 160 can assign the gradients 104, 105 and/or the remote gradients to specific iterations of updating the global machine learning model layers based on one or more criteria. The one or more criteria can include, for example, a threshold quantity of the gradients 104, 105 and/or the remote gradients, a threshold duration of time of updating using the gradient(s) and/or the additional gradient(s), and/or other criteria. In particular, the remote training engine 162 can identify multiple subsets of gradients generated by the client device 110 and the plurality of additional client devices 170 based on the access-restricted data (e.g., the audio data 101 and/or the image data 102), and can identify multiple subsets of gradients generated by the remote system 160 based on the publicly available data. Further, the remote training engine 162 can iteratively update the global machine learning model layers based on these subsets of gradients. For example, assume the remote training engine 162 identifies a first subset and a third subset of gradients that includes only gradients 104, 105 generated locally the client device 110 and the plurality of the additional client devices, and further assume the remote training engine 162 identifies a second subset and a fourth subset of gradients that includes only remote gradients generated remotely at the remote system 160. In this example, the remote training engine 162 can update one or more weights of the global machine learning model layers based on the first subset of the gradients generated locally at the client devices, then update one or more of the weights of the global machine learning model layers based on the second subset of the gradients generated remotely at the remote system 130, then update based on the third subset, then update based on the fourth subset, and so on in this manner.

In some further versions of those implementations, a quantity of gradients in the subsets that include only gradients generated locally the client device 110 and the plurality of the additional client devices can be the same as an additional quantity of remote gradients in the subsets that include only gradients generated remotely at the remote system 160. In yet further versions of those implementations, the remote system 160 can assign the gradient 104 and the additional gradient(s) 105 to various subsets for the specific iterations based on the client device(s) 110, 170 that transmitted the gradients. Each of the subsets can optionally include gradients from at least one unique client device that is not included in another one of the subsets. For example, the remote training engine 162 can update one or more of the weights of the global machine learning model layers based on 50 gradients that are generated locally at the client devices (or a first subset thereof), then update one or more of the weights of the global machine learning model layers based on 50 gradients that are generated remotely at the remote system 160, then update one or more of the weights of the global machine learning model layers based on 50 gradients that are generated locally at the client devices (or a second subset thereof), and so on. In other further versions of those implementations, the quantity of gradients in the subsets that include only gradients generated locally the client device 110 and the plurality of the additional client devices can vary from the additional quantity of remote gradients in the subsets that include only gradients generated remotely at the remote system 160. For example, the remote training engine 162 can update one or more of the weights of the global machine learning model layers based on 100 gradients that are generated locally at the client devices, then update one or more of the weights of the global machine learning model layers based on 50 gradients that are generated remotely at the remote system 160, and so on. In yet other further versions of those implementations, the quantity of gradients in the subsets that include only gradients generated locally the client device 110 and the plurality of the additional client devices, and the additional quantity of remote gradients in the subsets that include only gradients generated remotely at the remote system 160 may vary throughout training. For example, the remote training engine 162 can update one or more of the weights of the global machine learning model layers based on 100 gradients that are generated locally at the client devices, then update one or more of the weights of the global machine learning model layers based on 50 gradients that are generated remotely at the remote system 160, then update one or more of the weights of the global machine learning model layers based on 75 gradients that are generated locally at the client devices, and so on.

Figure 1D:
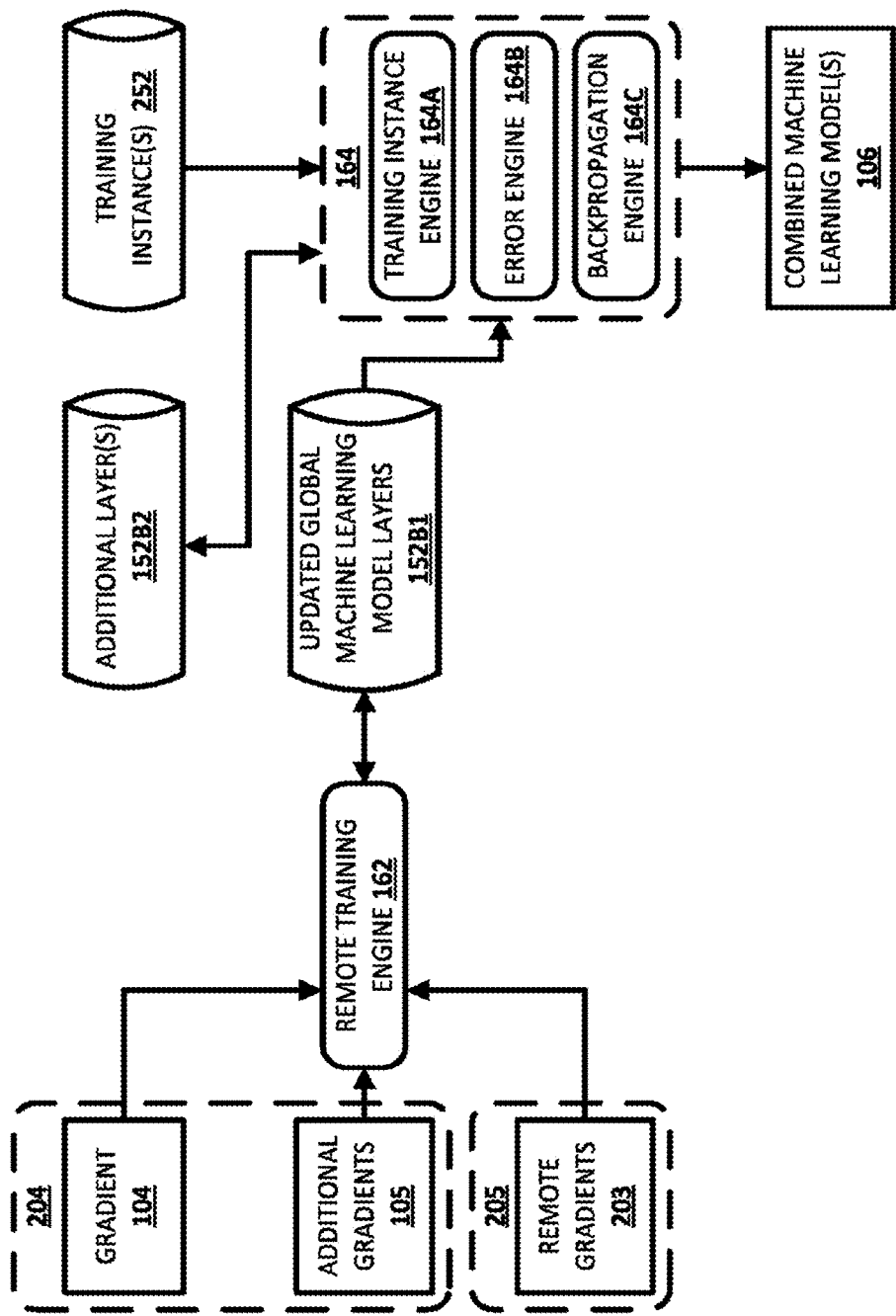

In some implementations, subsequent to updating one or more of the weights of the global machine learning model layers at the remote system 160, supervised learning engine 164 can combine the updated global machine learning model layers with additional layer(s) that are also stored in the global machine learning model(s) database 152B to generate combined machine learning model(s) 106. For instance, and as shown in FIG. 1D, the remote training engine 162 can generate updated global machine learning model layers 152B1 using the gradient 104, the additional gradients 105, and the remote gradients 203. Notably, the gradient 104 and the additional gradients 105 can be stored in a first buffer 204 and the remote gradients 203 can be stored in a second buffer 205. The gradients may optionally be stored in the first buffer 204 and the second buffer 205 until a sufficient quantity of gradients are present at the remote system to identify the multiple subsets of the gradients as described above (e.g., with respect to the remote training engine 162). By updating the global machine learning model layers using the remote gradients 205 that are generated based on the publicly available data, as well as the gradient(s) 104 and 105 generated based on the spoken utterance(s) of the users, the global machine learning model layers are updated using diverse data, thereby resulting in more robust global machine learning model layers than if the global machine learning model layers were to be updated solely on the spoken utterance(s) of the users. For instance, the global machine learning model layers can be updated to generate richer feature representations of speech since it is not biased towards spoken utterances that are commonly received at the client device(s) 110, 170.

The supervised learning engine 164 can combine the updated global machine learning model layers 152B1 with the additional layer(s) 152B2, that are upstream layers from the updated global machine learning model layers 152B1, and train the updated global machine learning model layers 152B1 along with the additional layer(s) 152B2, thereby resulting in the combined machine learning model(s) 106. More particularly, the supervised learning engine 164 can connect at least one output layer of the updated global machine learning model layers 152B1 to at least one input layer of the additional layer(s) 152B2. In connecting the at least one output layer of the updated global machine learning model layers 152B1 to the at least one input layer of the additional layer(s) 152B2, the supervised learning engine 164 can ensure the size and/or dimensions of the output layer of the updated global machine learning model layers 152B1 are compatible with the at least one input layer of the additional layer(s) 152B2.

Further, the supervised learning engine 164 can identify a plurality of training instances stored in training instance(s) database 252. Each of the plurality of training instances can include training instance input and corresponding training instance output (e.g., ground truth output). The plurality of training instances identified by the supervised learning engine 164 may be based on an end goal for which a given combined machine learning model is being trained. As one non-limiting example, assume that the given combined machine learning model is being trained as an automatic speech recognition model. In this example, the training instance input of each of the training instances can include training audio data, and the training instance output of ground truth output that corresponds to phoneme(s) or predicted token(s) that correspond to the training audio data. As another non-limiting example, assume that the given combined machine learning model is being trained as an object classification model. In this example, the training instance input of each of the training instances can include training image data, and the training instance output of ground truth output that corresponds to object classification(s) of object(s) included in the image data.

Further, training instance engine 164A of the supervised learning engine 164 can train the updated global machine learning model layers 152B1 along with the additional layer(s) 152B2 in a supervised manner based on the training instance(s) 252. Error engine 164B of the supervised learning engine 164 can determine error(s) based on the training, and backpropagation engine 164A can backpropagate the determined error(s) across the additional layer(s) 152B2 and/or update weight(s) of the additional layer(s) 152B2, thereby training the combined machine learning model(s) 106. In some implementations, the updated global machine learning model layers 152B1 remains fixed as the determined error(s) are backpropagated across the additional layer(s) 152B2 and/or the weight(s) of the additional layer(s) 152B2 are updated. In other words, only the additional layer(s) 152B2 are trained using supervised learning, while the updated global machine learning model layers 152B1 was updated using unsupervised learning. In some additional and/or alternative implementation, the determined error(s) are backpropagated across the updated global machine learning model layers 152B1 as well as the additional layer(s) 152B2. In other words, the global machine learning model layers 152B1 may be updated using unsupervised learning, and the combined machine learning model(s) 105, that include the updated global machine learning model layers 152B1 may be trained using supervised learning.

Turning back to FIG. 1A, an update distribution engine 166 can, responsive to one or more of the conditions being satisfied for the client device 110 or one or more of the plurality of additional client devices 170, transmit the combined machine learning model(s) 106 to the client device 110 and/or one or more of the plurality of additional client devices 170. The one or more conditions can include, for example, a threshold duration and/or quantity of training since updated weights and/or an updated speech recognition model was last provided. The one or more conditions can additionally or alternatively include, for example, a measured improvement to the combined machine learning model(s) 106 and/or passage of a threshold duration of time since the combined machine learning model(s) 106 was last transmitted to the client device 110 and/or one or more of the plurality of additional client devices 170. When the combined machine learning model(s) 106 is transmitted to the client device 110 (and/or or one or more of the plurality of additional client devices 170), the client device 110 can store the combined machine learning model(s) 106 in the local machine learning model(s) database 152A, thereby replacing prior versions of the combined machine learning model(s) 106. The client device 110 may subsequently use the combined machine learning model(s) 105 to make predictions based on further user input detected at the client device 110 (e.g., as described in greater detail with respect to FIG. 2). In some implementations, the remote system 160 can also cause the updated global machine learning model layers to be transmitted to the client device 110 and/or the additional client device 170 along with the combined machine learning model(s) 106. The client device 110 can store the updated global machine learning model layers in the local machine learning model(s) database 152A, and can utilize the updated global machine learning model layers as the portion used in encoding further audio data and/or further image data generated at the client device 110 (e.g., utilized by the encoding engine 122A of FIGS. 1B and 1C) subsequent to the audio data 101 and/or the image data 102.

The client device 110 and the plurality of additional client devices 170 can continue generating further gradients in the manner described herein and transmitting the further gradients to the remote system 160. Further, the remote system 160 can continue updating the global machine learning model layers as described herein. In some implementations, the remote system 160 can swap out the updated global machine learning model layers 152B1 in a given one of the combined machine learning model(s) 106 with a further updated global machine learning model layers, and can transmit the updated combined machine learning model(s) to the client devices. In some versions of those implementations, the updated combined machine learning model(s) may be further trained in a supervised manner as described herein prior to being transmitted to the client devices. Accordingly, the combined machine learning model(s) stored in the local machine learning model(s) database 152A can reflect those generated and trained at the remote system 160 as described herein.

In some additional and/or alternative implementations, the client device 110 and/or the additional client devices 170 may be restricted to those of various institutions across different service sectors (e.g., medical institutions, financial institutions, and so on). In some versions of those implementations, the combined machine learning model(s) 106 may be generated in a manner that leverages underlying data across these different service sectors, while also preserving privacy of the underlying data used in generating the gradient 104 and/or additional gradients 105 utilized in updating the global machine learning model layers. Moreover, the combined machine learning model(s) 106 generated for these institutions may be stored remotely at the remote system 160, and accessed at the remote system 160 as needed.

By first training the global machine learning model layers in this manner and then combining it in with the additional layer(s) of the other machine learning model(s), the resulting combined machine learning model(s) can be trained more efficiently. For example, trained by achieving the same level of performance using fewer training instances. For example, a high level of accuracy can be achieved for broad coverage of spoken utterance(s). Moreover, by training the global machine learning model layers in this manner using unsupervised learning, the training of the global machine learning model layers can be more computationally efficient in the sense that the need to label training instances is obviated.

Figure 2:
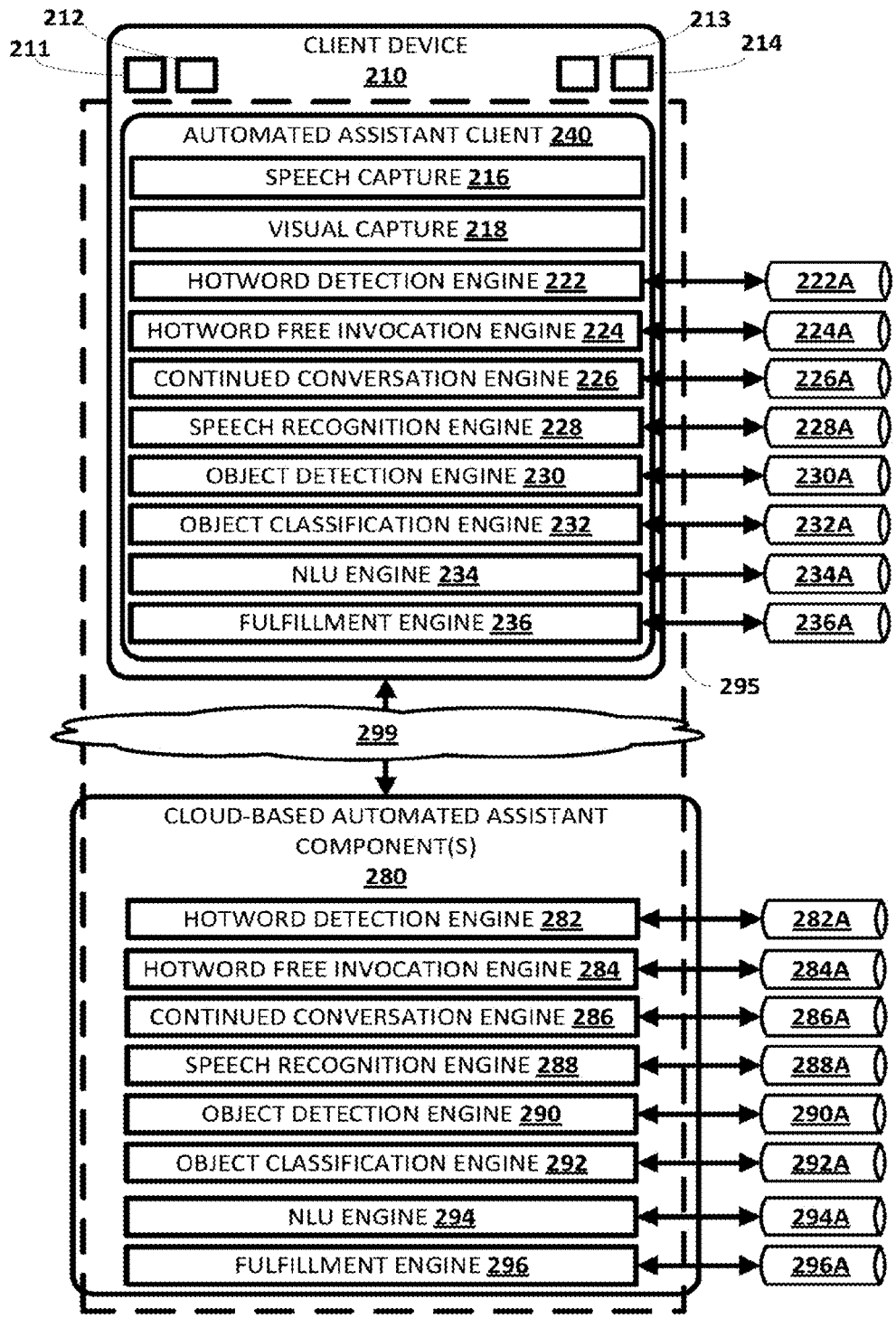
FIG. 2 depicts a block diagram of an example environment that includes various components from FIG. 1A, FIG. 1B, FIG. 1C, and FIG. 1D, and in which implementations disclosed herein may be implemented.

Turning now to FIG. 2, a client device 110 is illustrated in an implementation where various on-device machine learning engines, that utilize the combined machine learning models described herein, are included as part of (or in communication with) an automated assistant client 240. The respective machine learning models are also illustrated interfacing with the various on-device machine learning engines. Other components of the client device 210 are not illustrated in FIG. 2 for simplicity. FIG. 2 illustrates one example of how the various on-device machine learning engines of and their respective combined machine learning models can be utilized by the automated assistant client 240 in performing various actions.

The client device 210 in FIG. 2 is illustrated with one or more microphones 211, one or more speakers 212, one or more vision components 213, and display(s) 214 (e.g., a touch-sensitive display). The client device 210 may further include pressure sensor(s), proximity sensor(s), accelerometer(s), magnetometer(s), and/or other sensor(s) that are used to generate other sensor data that is in addition to audio data captured by the one or more microphones 211. The client device 210 at least selectively executes the automated assistant client 240. The automated assistant client 240 includes, in the example of FIG. 2, hotword detection engine 222, hotword free invocation engine 224, continued conversation engine 226, speech recognition engine 228, object detection engine 230, object classification engine 232, natural language understanding ("NLU") engine 234, and fulfillment engine 236. The automated assistant client 240 further includes speech capture engine 216, and visual capture engine 218. The automated assistant client 240 can further include additional and/or alternative engines, such as a voice activity detector (VAD) engine, an endpoint detector engine, a lip movement engine, and/or other engine(s) along with associated machine learning model(s).

One or more cloud-based automated assistant components 280 can optionally be implemented on one or more computing systems (collectively referred to as a "cloud" computing system) that are communicatively coupled to client device 210 via one or more local and/or wide area networks (e.g., the Internet) indicated generally at 299. The cloud-based automated assistant components 280 can be implemented, for example, via a cluster of high-performance servers. In various implementations, an instance of an automated assistant client 240, by way of its interactions with one or more cloud-based automated assistant components 280, may form what appears to be, from a user's perspective, a logical instance of an automated assistant 295 with which the user may engage in a human-to-computer interactions (e.g., spoken interactions, gesture-based interactions, and/or touch-based interactions).

The client device 210 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 216, to capture image data corresponding to vision frames (e.g., image frames, laser-based vision frames) of an environment in which the client device 210 is deployed. In some implementations, such vision frame(s) can be utilized to determine whether a user is present near the client device 210 and/or a distance of the user (e.g., the user's face) relative to the client device 210. Such determination(s) can be utilized, for example, in determining whether to activate the various on-device machine learning engines depicted in FIG. 2, and/or other engine(s). Further, speech capture engine 218 can be configured to capture a user's spoken utterance(s) and/or other audio data captured via the one or more microphones 211. Further, the client device 210 may include pressure sensor(s), proximity sensor(s), accelerometer(s), magnetometer(s), and/or other sensor(s) that are used to generate other sensor data that is in addition to the audio data captured via the microphone(s) 211.

As described herein, such audio data and other non-microphone sensor data can be processed by the various engines depicted in FIG. 2 to make predictions at the client device 210 using corresponding combined machine learning models (that include the updated global machine learning model layers) generated in the manner described above with respect to FIGS. 1A-1D. As some non-limiting example, the hotword detection engine 222 can utilize a combined hotword detection model 222A to predict whether audio data includes a hotword to invoke the automated assistant 295 (e.g., "Ok Google", "Hey Google", "What is the weather Google?", etc.); the hotword free invocation engine 224 can utilize a combined hotword free invocation model 224A to predict whether non-microphone sensor data (e.g., image data) includes a gesture or signal to invoke the automated assistant 295 (e.g., based on a gaze of the user and optionally further based on mouth movement of the user); the continued conversation engine 226 can utilize a combined continued conversation model 226A to predict whether further audio data includes is directed to the automated assistant 295 (e.g., or directed to an additional user in the environment of the client device 210); the speech recognition engine 228 can utilize a combined speech recognition model 228A to predict phoneme(s) and/or token(s) that correspond to audio data detected at the client device 210; the object detection engine 230 can utilize a combined object detection model 230A to predict object location(s) included in image data of an image captured at the client device 210; and the object classification engine 232 can utilize a combined object classification model 232A to predict object classification(s) of object(s) included in image data of an image captured at the client device 210.

In some implementations, the client device 210 may further include NLU engine 234 and fulfillment engine 236. The NLU engine 234 may perform on-device natural language understanding, utilizing NLU model 234A, on the predicted phoneme(s) and/or token(s) generated by the speech recognition engine 228 to generate NLU data. The NLU data can include, for example, intent(s) that correspond to the spoken utterance and optionally parameter(s) (e.g., slot values) for the intent(s). Further, the fulfillment engine can generate fulfillment data utilizing on-device fulfillment model 146A, and based on the NLU data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s). In other implementations, the NLU engine 234 and the fulfillment engine 236 may be omitted, and the speech recognition engine 228 can generate the fulfillment data directly based on the audio data. For example, assume the speech recognition engine 228 processes, using the combined speech recognition model 228A, a spoken utterance of "turn on the lights." In this example, the speech recognition engine 228 can generate a semantic output that is then transmitted to a software application associated with the lights that indicates that they should be turned on.

Notably, the cloud-based automated assistant component(s) 280 include cloud-based counterparts to the engines and models described herein with respect to FIG. 2. However, in various implementations, these engines and models may not be invoked since the engines and models may be transmitted directly to the client device 210 and executed locally at the client device 210 as described above with respect to FIGS. 1A-1D. Nonetheless, a remote execution module can also optionally be included that performs remote execution based on local or remotely generated NLU data and/or fulfillment data. Additional and/or alternative remote engines can be included. As described herein, in various implementations on-device speech processing, on-device image processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, if any of the on-device engines and/or models fail (e.g., due to relatively limited resources of client device 110), then the more robust resources of the cloud may be utilized.

Figure 3:
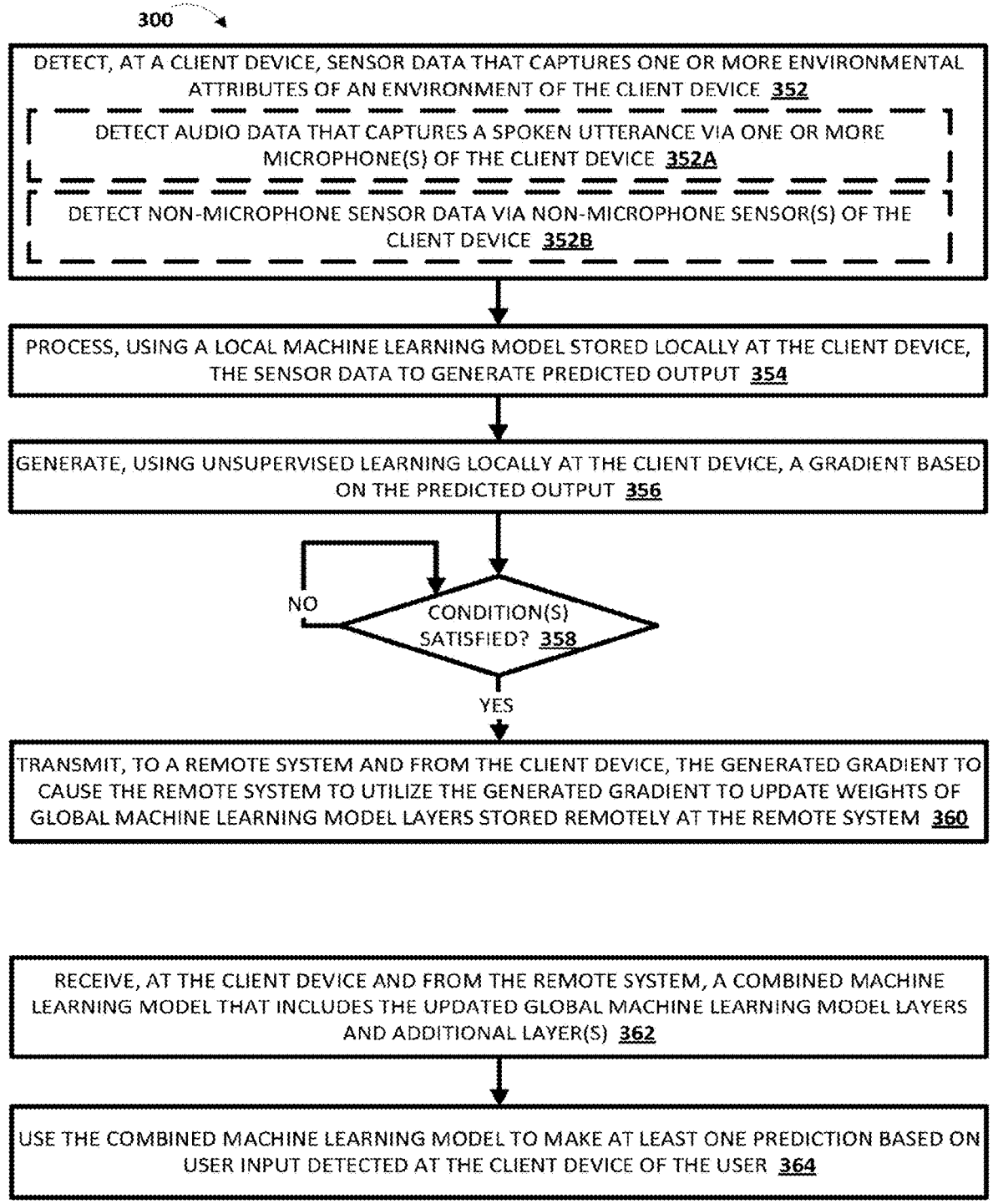
FIG. 3 depicts a flowchart illustrating an example method of generating a gradient, locally at a client device, using unsupervised learning, transmitting the generated gradient to a remote system that utilizes the generated gradient to update weight(s) of global machine learning model layers, and receiving a combined machine learning model, at the client device, that includes the updated global machine learning model layers and additional layer(s), in accordance with various implementations.

FIG. 3 depicts a flowchart illustrating an example method 300 of generating a gradient, locally at a client device, using unsupervised learning, transmitting the generated gradient to a remote system that utilizes the generated gradient to update weight(s) of global machine learning model layers, and receiving a combined machine learning model, at the client device, that includes the updated global machine learning model layers and additional layer(s). For convenience, the operations of the method 300 are described with reference to a system that performs the operations. The system of method 300 includes one or more processors and/or other component(s) of a client device. Moreover, while operations of the method 300 are shown in a particular order, this is not meant to be limiting. One or more operations may be reordered, omitted, or added.

At block 352, the system detects, at a client device, sensor data that captures one or more environment attributes of an environment of the client device. In some implementations, block 352 includes optional sub-block 352A. At optional sub-block 352A, the system detects audio data that captures a spoken utterance in the environment of the client device via one or more microphone(s) of the client device. The audio data captures at least a part of a spoken utterance of a user of the client device. In other implementations, block 352 includes optional sub-block 352B. At optional sub-block 352B, the system detects non-microphone sensor data via non-microphone sensor(s) of the client device. The non-microphone sensor data may include, for example, image data that captures the environment of the client device via vision component(s) of the client device.

At block 354, the system processes, using a local machine learning model stored locally at the client device, the sensor data to generate predicted output(s). The local machine learning model includes at least a portion that is used in generating an encoding of the sensor data. In some implementations, the local machine learning model may further include an additional portion that is used in decoding the encoding of the sensor data (e.g., as described in greater detail above with respect to FIG. 1B). In some additional and/or alternative implementations, the local machine learning model may further include an additional portion that is used in making a prediction based on the encoding of the sensor data (e.g., as described in greater detail above with respect to FIG. 1C).

At block 356, the system generates, using unsupervised learning locally at the client device, a gradient based on the predicted output. For example, assume that the sensor data detected at the client device is image data captured via the vision component(s) of the client device, and that the additional portion of the local machine learning model seeks to reconstruct the image data based on the encoding of the image data, resulting in predicted image data. In this example, the system can compare the image data to the predicted audio data to determine a difference therebetween, and the system can generate the gradient based on the determined difference. As another example, assume that the sensor data detected at the client device is audio data, including a first portion and a second portion that follows the first portion, captured via the microphone(s) of the client device, and that the additional portion of the local machine learning model seeks to predict the second portion of the audio data based on an encoding of the first portion of the audio data, resulting in a predicted second portion of the audio data. In this example, the system can compare the second portion of the audio data to the predicted second portion of the audio data to determine a difference therebetween, and the system can generate the gradient based on the determined difference. Generating the gradient using unsupervised learning at the client device is described in greater detail herein (e.g., with respect to FIGS. 1B and 1C)

At block 358, the system determines whether condition(s) for transmitting the gradient generated at block 356 are satisfied. The condition(s) can include, for example, that the client device is charging, that the client device has at least a threshold state of charge, that a temperature of the client device (based on one or more on-device temperature sensors) is less than a threshold, that the client device is not being held by a user, temporal condition(s) associated with the client device(s) (e.g., between a particular time period, every N hours or says, where N is a positive integer, and/or other temporal condition(s) associated with the client device(s)), whether a threshold number of gradient(s) have been generated by a given one of the client device(s), and/or other condition(s). If, at an iteration of block 358, the system determines that the condition(s) for transmitting the gradient generated at block 356 are not satisfied, then the system can continuously monitor for whether the condition(s) are satisfied at block 358. Notably, as the system monitors for satisfaction of the condition(s) at block 358, the system can continue generating additional gradient(s) in accordance with blocks 352-356 of the method 300. If, at an iteration of block 358, the system determines that the condition(s) for transmitting the gradient generated at block 356 are satisfied, then the system can proceed to block 360.

At block 360, the system transmits, to a remote system and from the client device, the generated gradient to cause the remote system to utilize the generated gradient to update weights of global machine learning model layers stored remotely at the remote system. Moreover, a plurality of additional client devices can generate additional gradients according to the method 300, and can transmit the additional gradients to the remote system when respective condition(s) are satisfied at the additional client devices. Updating the weights of the global machine learning model layers is described in greater detail herein (e.g., with respect to FIGS. 1A and 4).

At block 362, the system receives, at the client device and from the remote system, a combined machine learning model that includes the updated global machine learning model layers and additional layer(s). Notably, blocks 360 and 362 are not connected by an arrow. This indicates that the combined machine learning model is received at the client device when the remote system determines to transmit the combined machine learning model to the client as described in greater detail herein (e.g., with respect to FIGS. 1A, 1D, and 4) based on satisfaction of one or more conditions at the client device and/or the remote system.

At block 364, the system uses the combined machine learning model to make at least one prediction based on user input detected at the client device of the user. The predictions made at the client device may depend on the additional layer(s) utilized to generate the combined machine learning model and/or the training instance(s) utilized to train the combined machine learning model at the remote system. Using the combined machine learning model to make predictions at the client device is described in greater detail herein (e.g., with respect to the various engines and models of FIG. 2).

Figure 4:
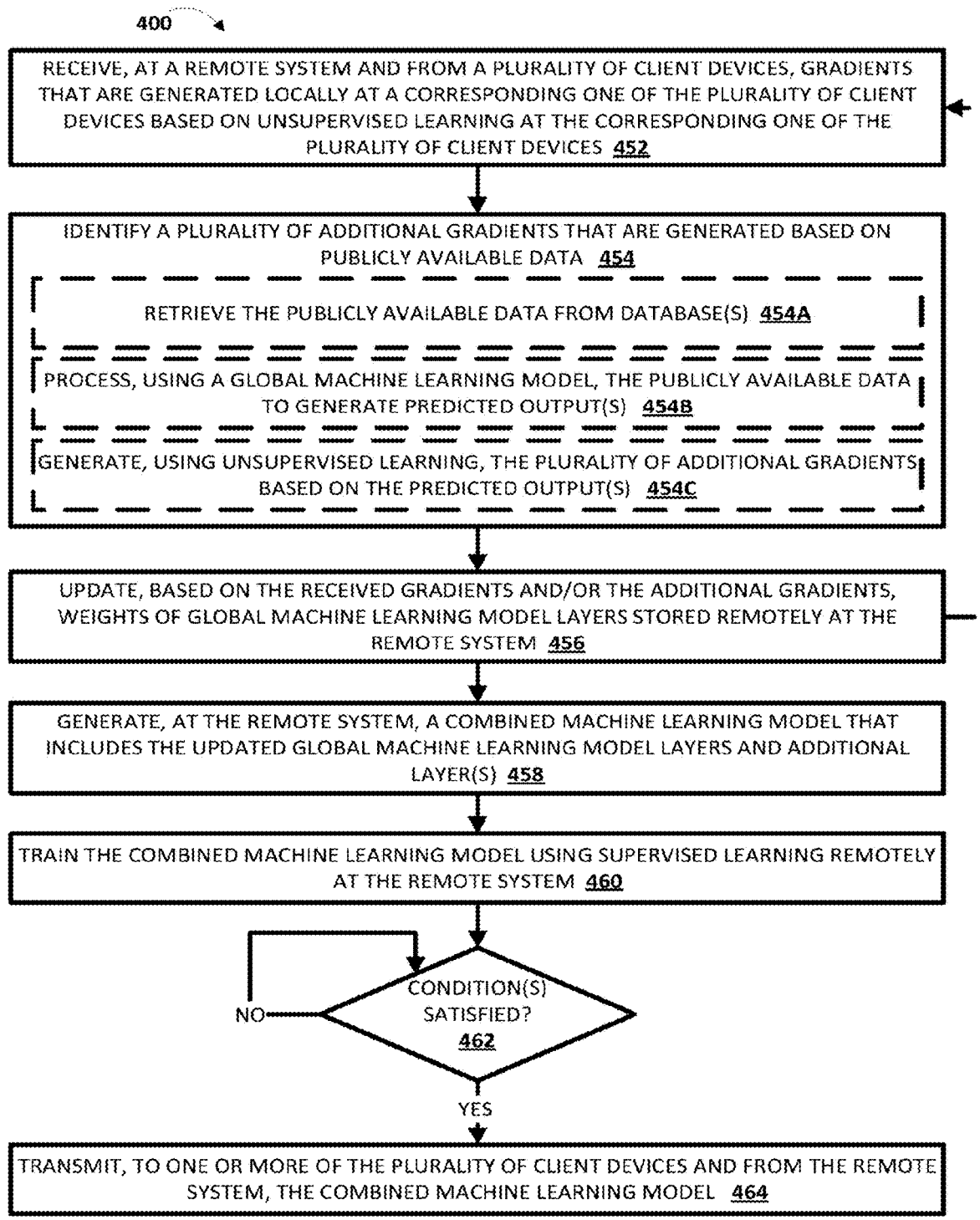
FIG. 4 depicts a flowchart illustrating an example method of updating weight(s) of global machine learning model layers model based on gradient(s) received from a plurality of client devices and/or generated at the remote system based on publicly available data, generating a combined machine learning model that includes the updated global machine learning model layers and additional layer(s), and transmitting the combined machine learning model to one or more of the plurality of client devices, in accordance with various implementations.

FIG. 4 depicts a flowchart illustrating an example method 400 of updating weight(s) of global machine learning model layers based on gradient(s) received from a plurality of client devices and/or generated at the remote system based on publicly available data, generating a combined machine learning model that includes the updated global machine learning model layers and additional layer(s), and transmitting the combined machine learning model to one or more of the plurality of client devices. For convenience, the operations of the method 400 are described with reference to a system that performs the operations. The system of method 400 includes one or more processors and/or other component(s) of a remote system. Moreover, while operations of the method 400 are shown in a particular order, this is not meant to be limiting. One or more operations may be reordered, omitted, or added.

At block 452, the system receives, at a remote system and from a plurality of client devices, gradients that are generated locally at a corresponding one of the plurality of client devices based on unsupervised learning at the corresponding one of the client devices. In particular, audio data and/or image data generated locally at the corresponding one of the client devices can be processed, using a respective local machine learning model stored locally on the corresponding one of the plurality of client devices. The respective local machine learning model may include a respective portion that is used in generating an encoding of the audio data and/or the image data. Generating the gradients in an unsupervised manner at the corresponding one of the client devices is described in greater detail herein (e.g., with respect to FIGS. 1A-1C and 3).

At block 454, the system identifies a plurality of additional gradients that are generated based on publicly available data. The publicly available data can be retrieved from an online video-sharing platform, image-sharing platform, and/or audio-sharing platform that is not access-restricted like the audio data and the image data generated locally at the corresponding one of the client devices. These additional gradients are also referred to herein as remote gradients since they are generated at the remote system using the publicly available data. In some implementations, block 454 may include optional sub-blocks 454A, 454B, and 454C. At sub-block 454A, the system retrieves the publicly available data from database(s) (e.g., publicly available data database 180 of FIG. 1A). At sub-block 454B, the system processes, using a global machine learning model, the publicly available data to generate predicted output(s). Similar to the respective local machine learning model at each of the plurality of client devices, the global machine learning model may also include a respective portion that is used in generating an encoding of the audio data and/or the image data. At sub-block 454C, the system generates, using unsupervised learning, the plurality of additional gradient(s) based on the predicted output(s) generated at sub-block 454B. Thus, the additional gradients can be generated in a similar manner to the gradients that are received from the plurality of client devices (e.g., as described in greater detail herein with respect to FIGS. 1A-1D).

At block 456, the system updates, based on the received gradients and/or the additional gradients, weights of a global machine learning model layers stored remotely at the remote system. The global machine learning model layers correspond to the portion of the respective local machine learning model that is used in generating the encoding of the audio data and/or the image data. Notably, as indicated by the dashed line from block 456 to block 452, the system can repeat the operations of blocks 452, 454, and 456 until the updating of the global machine learning model layers is complete. The system can determine that the updating of the global machine learning model layers is complete based on, for example, a threshold duration and/or threshold quantity of gradients since updated weights and/or the global machine learning model layers was last trained as part of a combined machine learning model, a measured improvement to the global machine learning model layers, and/or passage of a threshold duration of time since updated weights and/or the global machine learning model layers was last trained as part of a combined machine learning model. Once the global machine learning model layers are updated, the system may then proceed to block 458.

At block 458, the system generates, at the remote system, a combined machine learning model that includes the updated global machine learning model layers and additional layer(s). The system can connect an output layer of the global machine learning model layers to at least one input layer of the additional layer(s), and can ensure that the size and/or dimensions of the output layer of the global machine learning model layers match those of the at least one input layer of the additional layer(s). At block 460, the system trains the combined machine learning model using supervised learning remotely at the remote system. The system can identify training instance(s) for a particular use (e.g., speech recognition, hotword detection, object detection, and so on), and can train the combined machine learning model based on the training instance(s). Generating of the combined machine learning model, and the training thereof in a supervised manner, is described in greater detail herein (e.g., with respect to FIGS. 1A and 1D).

At block 462, the system determines whether condition(s) for transmitting the combined machine learning model trained at block 460 are satisfied. The condition(s) can be based on whether the client device(s) are ready to receive the combined machine learning model (e.g., the same as the conditions described above with respect to block 358 of FIG. 3), other conditions that are specific to the remote system (e.g., based on performance of the combined machine learning model satisfying a performance threshold, based on the combined machine learning model being trained based on a threshold quantity of training instances, and so on), and/or some combination of these condition(s). If, at an iteration of block 462, the system determines that the condition(s) for transmitting the combined machine learning model trained at block 460 are not satisfied, then the system can continuously monitor for whether the condition(s) are satisfied at block 462. Notably, as the system monitors for satisfaction of the condition(s) at block 462, the system can continue updating the global machine learning model layers and training the combined machine learning model in accordance with blocks 452-460 of the method 300. If, at an iteration of block 462, the system determines that the condition(s) for transmitting the combined machine learning model trained at block 460 are satisfied, then the system can proceed to block 464.

At block 464, the system can transmit, to one or more of the plurality of client devices and from the remote system the combined machine learning model. The system can transmit the combined machine learning model to each of the plurality of client devices that transmitted gradients to the remote system, additional client devices beyond those that transmitted the gradients to the remote system, or a subset of those client devices that transmitted the gradients to the remote system. Transmitting of the combined machine learning model is described in greater detail herein (e.g., with respect to the update distribution engine 166 of FIG. 1A).

Figure 5:
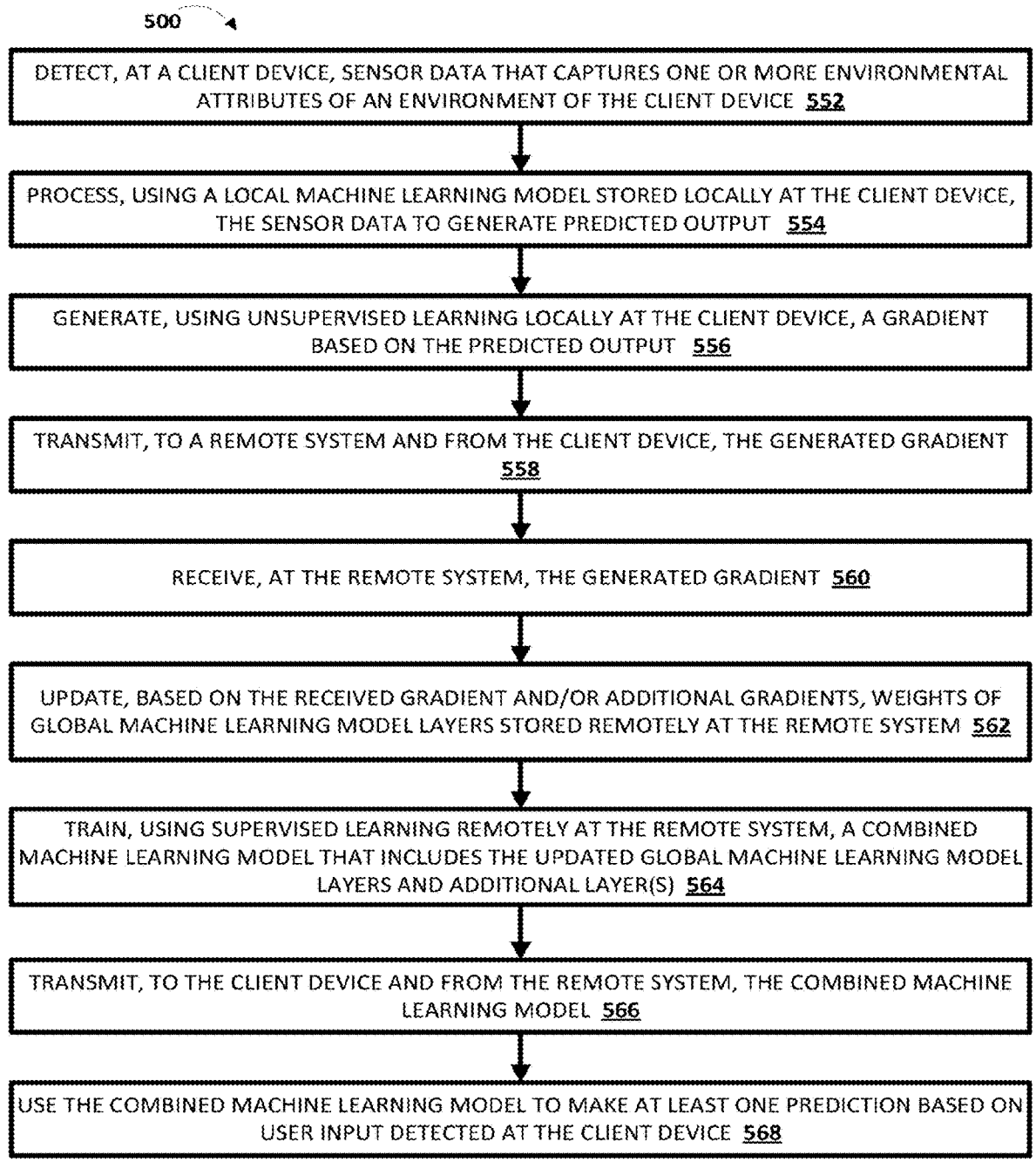
FIG. 5 depicts a flowchart illustrating an example method of generating a gradient at a client device using unsupervised learning, updating weight(s) of global machine learning model layers based on the gradient, training a combined machine learning model that includes the updated global machine learning model layers and additional layer(s), and using, at the client device, the combined machine learning model to make prediction(s) based on user input detected at the client device, in accordance with various implementations.

FIG. 5 depicts a flowchart illustrating an example method 500 of generating a gradient at a client device using unsupervised learning, updating weight(s) of global machine learning model layers based on the gradient, training a combined machine learning model that includes the updated global machine learning model layers and additional layer(s), and using, at the client device, the combined machine learning model to make prediction(s) based on user input detected at the client device. For convenience, the operations of the method 500 are described with reference to a system that performs the operations. The system of method 500 includes one or more processors and/or other component(s) of a client device and/or remote system. Moreover, while operations of the method 500 are shown in a particular order, this is not meant to be limiting. One or more operations may be reordered, omitted, or added.

At block 552, the system detects, at a client device, sensor data that captures one or more environmental attributes of an environment of the client device. The sensor data can be audio data generated by microphone(s) of the client device and/or non-microphone data (e.g., image data) generated by other sensor(s) of the client device (e.g. as described with respect to block 352 of FIG. 3). At block 554, the system processes, using a local machine learning model stored locally at the client device, the sensor data to generate predicted output. The local machine learning model includes a portion that is used in generating an encoding of the sensor data detected at the client device at block 552. For example, the portion used in generating the encoding of the sensor data may be an encoder portion of an encoder-decoder model, a generator model of a CycleGAN model, and/or other portions of other models capable of generating a feature representation of the sensor data detected at the client device. At block 556, the system generates, using unsupervised learning locally at the client device, a gradient based on the predicted output. As described in greater detail herein with respect to FIGS. 1B and 1C, generating the gradient may be based on the predicted output. At block 558, the system transmits, to a remote system and from the client device, the generated gradient. The system may transmit the gradient (and optionally other gradients generated at the client device that are in addition to the gradient) when condition(s) are satisfied at the client device (e.g., as described with respect to block 358 of FIG. 3).

At block 560, the system receives, at the remote system, the generated gradient. More particularly, the system can receive the gradient (and optionally other gradients generated at the client device that are in addition to the gradient), and additional gradients generated locally at a plurality of additional client devices. At block 562, the system updates, based on the received gradient and/or additional gradients, weights of global machine learning model layers stored remotely at the remote system. The additional gradients may further include remote gradients that are generated at the remote system based on publicly available data as described in greater detail herein (e.g., with respect to FIGS. 1A, 1D, and 4).

At block 564, the system trains, using supervised learning remotely at the remote system, a combined machine learning model that includes the updated global machine learning model layers and additional layer(s). The system trains the combined machine learning model using labeled training instances. The labeled training instances identified for training the combined machine learning may be based on the additional layer(s) combined with the updated global machine learning model layers. For example, if the additional layer(s) are additional layer(s) for a speech recognition model, then the identified training instances may be specific to training the speech recognition model. In contrast, if the additional layer(s) are additional layer(s) for an object detection model, then the identified training instances may be specific to training the object detection model. At block 566, the system transmits, to the client device and from the remote system, the combined machine learning model. In some implementations, the system may also transmit, to the client device, the updated global machine learning model layers. The client device may then use the updated global machine learning model layers in generating encodings of further sensor data generated at the client device, thereby updating the local machine learning model used in generating the predicted output. At block 568, the system uses the combined machine learning model to make at least one prediction based on user input detected at the client device. Some non-limiting examples of predictions made using various combined machine learning models are described in greater detail herein (e.g., with respect to FIG. 2).

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A and 1B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes detecting, via one or more microphones of the client device, audio data that captures at least part of a spoken utterance of a user of the client device, and processing, using a local machine learning model stored locally on the client device, the audio data to generate predicted output. The local machine learning model includes a portion used in generating an encoding of the audio data. The method further includes generating, using unsupervised learning, a gradient based on the predicted output, and transmitting, to a remote system and from the client device, the generated gradient to cause the remote system to utilize the generated gradient to update weights of global machine learning model layers that are stored remotely at the remote system and that correspond to the portion, of the local machine learning model, used in generating the encoding of the audio data. The method further includes, subsequent to the remote system updating the weights of the global machine learning model layers utilizing the generated gradient and the remote system further updating the weights based on additional gradients from additional client devices, receiving, at the client device and from the remote system, a combined machine learning model that includes the updated global machine learning model layers and one or more additional layers, and using the combined machine learning model to make at least one prediction based on further audio data, detected via one or more of the microphones of the client device, that captures at least part of a further spoken utterance of the user of the client device.

These and other implementations of the technology can include one or more of the following features.

In some implementations, the portion of the local machine learning model stored locally on the client device is used to generate the encoding. The encoding is processed using an additional portion of the local machine learning model to generate the predicted output, and the predicted output is predicted audio data. In some versions of those implementations, generating the gradient based on the predicted output includes comparing the audio data that captures at least part of the spoken utterance of the user of the client device to the predicted audio data, and generating the gradient based on comparing the audio data and the predicted audio data. In other versions of those implementations, the audio data that captures at least part of the spoken utterance of the user of the client device captures a first portion of the spoken utterance that is followed by a second portion of the spoken utterance, and generating the gradient is based on comparing the predicted audio data to additional audio data corresponding to the second portion of the spoken utterance. In some further versions of those implementations, comparing the predicted audio data to the additional audio data corresponding to the second portion of the spoken utterance includes comparing an audio waveform corresponding to the additional audio data that corresponds to the second portion of the spoken utterance to a predicted audio waveform corresponding to the predicted audio data, and generating the gradient based on comparing the audio waveform and the predicted audio waveform.

In some implementations, the combined machine learning model is an automatic speech recognition (ASR) model, and the at least one prediction includes a plurality of predicted phonemes, or a plurality of predicted tokens, that correspond to the further spoken utterance.

In some implementations, receiving the combined machine learning model and using the combined machine learning model are further subsequent to the remote system updating the weights of the global machine learning model layers utilizing publicly available audio data to generate further gradients. Each of the further gradients are generated remotely at the remote server based on: unsupervised learning, at the remote system, that is based on processing, using a global machine learning model stored remotely at the remote server, the publicly available audio data that captures a publicly available spoken utterance, and the global machine learning model includes the global machine learning model layers used in generating a further encoding of the publicly available audio data. In some versions of those implementations, the remote system utilizes the gradient generated at the client device, and additional gradients generated at additional client devices using unsupervised learning, to update the weights of the global machine learning model layers, and the remote system utilizes the further gradients generated at the remote system, subsequent to utilizing the gradient generated at the client device and the additional gradients generated at additional client devices, to update the weights of the global machine learning model layers.

In some implementations, a method performed by one or more processors of a client device is provided and includes receiving, from a plurality of client devices and at the remote system, gradients. Each of the gradients are generated locally at a corresponding one of the plurality of client devices based on: unsupervised learning, at the corresponding one of the plurality of client devices, that is based on processing, using a respective local machine learning model stored locally on the corresponding one of the plurality of client devices, audio data that captures a spoken utterance, and the respective local machine learning model includes a respective portion used in generating an encoding of the audio data. The method further includes updating, based on the received gradients, weights of global machine learning model layers that are stored remotely at the remote system and that correspond to the portion, of the respective local machine learning model, used in generating the encoding of the audio data. The method further includes, subsequent to updating the weights of the global machine learning model layers based on the generated gradients: generating a combined machine learning model that includes the updated global machine learning model layers and one or more additional layers, and training the combined machine learning model using supervised learning. The method further includes subsequent to training the combined machine learning model: transmitting the combined machine learning model to one or more of the plurality of client devices. The one or more of the plurality of client devices utilize the combined machine learning to make at least one prediction based on further audio data, detected via one or more of the microphones of the client device, that captures at least part of a further spoken utterance of the user of the client device.

These and other implementations of the technology can include one or more of the following features.

In some implementations, generating the combined machine learning model includes connecting an output layer the updated global machine learning model layers to at least one input layer of the one or more additional layers.

In some implementations, training the combined machine learning model using supervised learning includes identifying a plurality of training instances, each of the training instances having: training instance input that includes training audio data, and corresponding training instance output that includes ground truth output. The method further includes determining an error based on applying the plurality of training instances as input across the combined machine learning model to generate corresponding predicted outputs and comparing the corresponding predicted outputs to the corresponding training instance outputs, and updating weights of the one or more additional layers of the combined machine learning model based on the error, while keeping the updated global machine learning model layers of the combined machine learning model fixed.

In some implementations, training the combined machine learning model using supervised learning includes identifying a plurality of training instances, each of the training instances having: training instance input that includes training audio data, and corresponding training instance output that includes ground truth output. The method further includes determining an error based on applying the plurality of training instances as input across the combined machine learning model to generate corresponding predicted outputs and comparing the corresponding predicted outputs to the corresponding training instance outputs, and backpropagating the determined error across the one or more additional layers of the combined machine learning model and one or more layers of the updated global machine learning model layers of the combined machine learning model.

In some implementations, the method further includes receiving, from the plurality of client devices and at the remote system, additional gradients. Each of the additional gradients are generated locally at the corresponding one of the plurality of client devices based on: unsupervised learning, at the corresponding one of the plurality of client devices, that is based on processing, using the respective local machine learning model stored locally on the corresponding one of the plurality of client devices, additional audio data that captures an additional spoken utterance, and the respective local machine learning model includes the respective portion used in generating the encoding of the additional audio data. The method further includes updating, based on the received additional gradients, weights of the global machine learning model layers stored remotely at the remote system. The method further includes, subsequent to further updating the weights of the global machine learning model layers based on the received additional gradients: modifying the combined machine learning model to generate an updated combined machine learning model that includes the further updated global machine learning model layers and one or more of the additional layers, and training the updated combined machine learning model using supervised learning. The method further includes subsequent to training the updated combined machine learning model: transmitting the updated combined machine learning model to one or more of the plurality of client devices to replace the combined machine learning model.

In some implementations, the method further includes retrieving, from one or more databases, publicly available audio data that captures a plurality of publicly available spoken utterances, processing, using a global machine learning model, the publicly available audio data to generate predicted outputs. The global machine learning model includes the global machine learning model layers used in generating corresponding encodings of the publicly available audio data. The method further includes generating, using unsupervised learning, a plurality of additional gradients based on the predicted outputs, and updating the weights of the global machine learning model layers stored remotely at the remote system is further based on the plurality of the additional gradients.

In some versions of those implementations, updating the weights of the global machine learning model layers stored remotely at the remote system includes identifying, from the gradients received from the plurality of client devices, a first set of gradients, identifying, from the additional gradients generated based on the publicly available audio data, a second set of gradients, updating the global machine learning model layers based on the first set of gradients, and subsequent to updating the global machine learning model layers based on the first set of gradients: updating the global machine learning model layers based on the second set of gradients.

In some further versions of those implementations, identifying the first set of gradients is based on a first threshold number of the received gradients included in the first set of gradients, and identifying the second set of gradients is based on a second threshold number of the generated gradients included in the second set of gradients.

In some implementations, a method performed by one or more processors of a client device is provided and includes detecting, via one or more microphones of a client device, audio data that captures a spoken utterance of a user of the client device, processing, using a local machine learning model stored locally on the client device, the audio data to generate predicted output, wherein the local machine learning model includes a portion used in generating an encoding of the audio data, generating, using unsupervised learning locally at the client device, a gradient based on the predicted output, transmitting, to a remote system and from the client device, the generated gradient, receiving, at the remote system and from the client device, the generated gradient, and updating, at the remote system, one or more weights of global machine learning model layers based on the generated gradient. The method further includes subsequent to updating one or more of the weights of the global machine learning model layers based on the generated gradients, training, using supervised learning remotely at the remote system, a combined machine learning model that includes the updated global machine learning model layers and one or more additional layers. The method further includes transmitting, to the client device and from the remote system, the combined machine learning model, and using the combined machine learning model to make at least one prediction based on further audio data, detected via one or more of the microphones of the client device, that captures at least part of a further spoken utterance of the user of the client device.

These and other implementations of the technology can include one or more of the following features.

In some implementations, the combined machine learning model is an automatic speech recognition (ASR) model, and the at least one prediction includes a plurality of predicted phonemes, or a plurality of predicted tokens, that correspond to the further spoken utterance.

In some implementations, the combined machine learning model is a hotword detection model, and the at least one prediction includes an indication of whether the further utterance includes a hotword that invokes an automated assistant.

In some implementations, the combined machine learning model is a voice activity detection model, and the at least one prediction includes an indication of whether the further utterance is human speech in an environment of the client device.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method performed by one or more processors of a client device, the method comprising:
    detecting, via one or more non-microphone sensors of the client device, image data that captures at least part of an environment of a user of the client device;
    processing, using a local machine learning model stored locally on the client device, the image data to generate predicted output,
        wherein the local machine learning model includes at least a first set of local machine learning model layers and a second set of local machine learning model layers,
        wherein the first set of local machine learning model layers is used in generating, based on processing the image data, an encoding of the image data, and
        wherein the second set of local machine learning model layers is used in generating, based on processing the encoding of the image data that is generated using the first set of local machine learning model layers, the predicted output;
    generating, using unsupervised learning, a gradient based on the predicted output; and
    transmitting, to a remote system and from the client device, the generated gradient to cause the remote system to utilize the generated gradient to update weights of global machine learning model layers that are stored remotely at the remote system and that correspond structurally to the first set of local machine learning model layers, of the local machine learning model, used in generating the encoding of the image data, and
    subsequent to the remote system updating the weights of the global machine learning model layers utilizing the generated gradient received from the client device and additional gradients received from additional client devices:
        receiving, at the client device and from the remote system, a combined machine learning model that includes the updated global machine learning model layers and one or more additional layers; and
        using the combined machine learning model to make at least one prediction based on further image data, detected via one or more of the non-microphone sensors of the client device, that captures at least part of the environment of the user of the client device.

2. The method of claim 1, wherein the predicted output is predicted image data.

3. The method of claim 2, wherein generating the gradient based on the predicted output comprises:
comparing the image data that captures at least part of the environment of the user of the client device to the predicted image data; and
generating the gradient based on comparing the image data and the predicted image data.

4. The method of claim 2, wherein the image data that captures at least part of the environment of the user of the client device captures a first image in a stream of images that is followed by a second image in the stream of images, and wherein generating the gradient is based on comparing the predicted image data to additional image data corresponding to the second image in the stream of images.

5. The method of claim 1, wherein the combined machine learning model is a hotword free invocation model, and wherein the at least one prediction comprises an indication of whether to invoke an automated assistant.

6. The method of claim 1, wherein the combined machine learning model is an object classification model, and wherein the at least one prediction comprises one or more predicted objects in the environment of the client device of the user.

7. The method of claim 1, wherein receiving the combined machine learning model and using the combined machine learning model are further subsequent to the remote system updating the weights of the global machine learning model layers utilizing publicly available image data to generate further gradients, wherein each of the further gradients are generated remotely at the remote system based on:
unsupervised learning, at the remote system, that is based on processing, using a global machine learning model stored remotely at the remote system, the publicly available image data that captures a publicly available environment, wherein the global machine learning model includes the global machine learning model layers used in generating a further encoding of the publicly available image data.

8. The method of claim 7, wherein the remote system utilizes the gradient generated at the client device, and additional gradients generated at additional client devices using unsupervised learning, to update the weights of the global machine learning model layers, and wherein the remote system utilizes the further gradients generated at the remote system, subsequent to utilizing the gradient generated at the client device and the additional gradients generated at additional client devices, to update the weights of the global machine learning model layers.

9. A method performed by one or more processors of a remote system, the method comprising:
receiving, from a plurality of client devices and at the remote system, gradients, wherein each of the gradients are generated locally at a corresponding one of the plurality of client devices based on:
unsupervised learning, at the corresponding one of the plurality of client devices, that is based on processing, using a respective local machine learning model stored locally on the corresponding one of the plurality of client devices, image data that captures a corresponding environment,
wherein the respective local machine learning model includes a respective first set of local machine learning model layers and a respective second set of local machine learning model layers,
wherein the respective first set of local machine learning model layers is used in generating, based on processing the image data, an encoding of the image data,
wherein the respective second set of local machine learning model layers is used in generating, based on processing the encoding of the image data that is generated using the respective first set of local machine learning model layers, predicted output, and
wherein a gradient is generated, using unsupervised learning, based on the predicted output;
updating, based on the received gradients, weights of global machine learning model layers that are stored remotely at the remote system and that correspond structurally to the respective first set of local machine learning model layers, of the respective local machine learning model, used in generating the encoding of the image data;
subsequent to updating the weights of the global machine learning model layers based on the generated gradients:
generating a combined machine learning model that includes the updated global machine learning model layers and one or more additional layers; and
training the combined machine learning model using supervised learning; and
subsequent to training the combined machine learning model:
transmitting the combined machine learning model to one or more of the plurality of client devices, wherein the one or more of the plurality of client devices utilize the combined machine learning model to make at least one prediction based on further image data, detected via one or more non-microphone sensors of the client device, that captures at least part of the corresponding environment of the user of the client device.

10. The method of claim 9, wherein generating the combined machine learning model comprises connecting an output layer, of the updated global machine learning model layers, to at least one input layer, of the one or more additional layers.

11. The method of claim 9, wherein training the combined machine learning model using supervised learning comprises:
identifying a plurality of training instances, each of the training instances having:
training instance input that includes training image data, and
corresponding training instance output that includes ground truth output;
determining an error based on applying the plurality of training instances as input across the combined machine learning model to generate corresponding predicted outputs and comparing the corresponding predicted outputs to the corresponding training instance outputs; and
updating weights of the one or more additional layers of the combined machine learning model based on the error, while keeping the updated global machine learning model layers of the combined machine learning model fixed.

12. The method of claim 9, wherein training the combined machine learning model using supervised learning comprises:
identifying a plurality of training instances, each of the training instances having:

training instance input that includes training image data, and corresponding training instance output that includes ground truth output;

determining an error based on applying the plurality of training instances as input across the combined machine learning model to generate corresponding predicted outputs and comparing the corresponding predicted outputs to the corresponding training instance outputs; and backpropagating the determined error across the one or more additional layers of the combined machine learning model and one or more layers of the updated global machine learning model layers of the combined machine learning model.

13. The method of claim 9, further comprising:

receiving, from the plurality of client devices and at the remote system, additional gradients, wherein each of the additional gradients are generated locally at the corresponding one of the plurality of client devices based on:

unsupervised learning, at the corresponding one of the plurality of client devices, that is based on processing, using the respective local machine learning model stored locally on the corresponding one of the plurality of client devices, additional image data that captures an additional corresponding environment;

further updating, based on the received additional gradients, weights of the global machine learning model layers stored remotely at the remote system;

subsequent to further updating the weights of the global machine learning model layers based on the received additional gradients:

modifying the combined machine learning model to generate an updated combined machine learning model that includes the further updated global machine learning model layers and one or more of the additional layers; and training the updated combined machine learning model using supervised learning; and subsequent to training the updated combined machine learning model:

transmitting the updated combined machine learning model to one or more of the plurality of client devices to replace the combined machine learning model.

14. The method of claim 9, further comprising:

retrieving, from one or more databases, publicly available image data that captures a plurality of corresponding publicly available environments;

processing, using a global machine learning model, the publicly available image data to generate predicted outputs, wherein the global machine learning model includes the global machine learning model layers used in generating corresponding encodings of the publicly available image data;

generating, using unsupervised learning, a plurality of additional gradients based on the predicted outputs; and wherein updating the weights of the global machine learning model layers stored remotely at the remote system is further based on the plurality of the additional gradients.

15. The method of claim 14, wherein updating the weights of the global machine learning model layers stored remotely at the remote system comprises:

identifying, from the gradients received from the plurality of client devices, a first set of gradients;

identifying, from the additional gradients generated based on the publicly available image data, a second set of gradients;

updating the global machine learning model layers based on the first set of gradients; and subsequent to updating the global machine learning model layers based on the first set of gradients:

updating the global machine learning model layers based on the second set of gradients.

16. The method of claim 15, wherein identifying the first set of gradients is based on a first threshold number of the received gradients included in the first set of gradients, and wherein identifying the second set of gradients is based on a second threshold number of the generated gradients included in the second set of gradients.

17. A method performed by one or more processors, the method comprising:

detecting, via one or more non-microphone sensors of a client device, image data that captures an environment of a user of the client device;

processing, using a local machine learning model stored locally on the client device, the image data to generate predicted output, wherein the local machine learning model includes at least a first set of local machine learning model layers and a second set of local machine learning model layers, wherein the first set of local machine learning model layers is used in generating, based on processing the image data, an encoding of the image data, and wherein the second set of local machine learning model layers is used in generating, based on processing the encoding of the image data that is generated using the first set of local machine learning model layers, the predicted output;

generating, using unsupervised learning locally at the client device, a gradient based on the predicted output;

transmitting, to a remote system and from the client device, the generated gradient;

receiving, at the remote system and from the client device, the generated gradient;

updating, at the remote system, one or more weights of global machine learning model layers based on the generated gradient, wherein the global machine learning model layers correspond structurally to first set of local machine learning model layers of the local machine learning model;

subsequent to updating one or more of the weights of the global machine learning model layers based on the generated gradients, training, using supervised learning remotely at the remote system, a combined machine learning model that includes the updated global machine learning model layers and one or more additional layers;

transmitting, to the client device and from the remote system, the combined machine learning model; and using the combined machine learning model to make at least one prediction based on further image data, detected via one or more of the non-microphone sensors of the client device, that captures the environment of the user of the client device.

18. The method of claim 17, wherein the combined machine learning model is a hotword free invocation model, and wherein the at least one prediction comprises an indication of whether to invoke an automated assistant.

19. The method of claim 17, wherein the combined machine learning model is an object classification model, and wherein the at least one prediction comprises one or more predicted objects in the environment of the client device of the user.

* * * * *